United States Patent
Van Essen

(10) Patent No.: US 12,447,061 B2
(45) Date of Patent: Oct. 21, 2025

(54) ARRANGEMENT FOR COMPRESSION TREATMENT, IN PARTICULAR COMPRESSION THERAPY ARRANGEMENT AND METHOD FOR OPERATING AND MONITORING THE SAME

(71) Applicant: Lohmann & Rauscher GmbH, Vienna (AT)

(72) Inventor: Adam Van Essen, Milwaukee, WI (US)

(73) Assignee: LOHMANN & RAUSCHER GMBH, Vienna (AT)

( * ) Notice: Subject to any disclaimer, the term of this patent is extended or adjusted under 35 U.S.C. 154(b) by 354 days.

(21) Appl. No.: 18/020,252

(22) PCT Filed: Dec. 1, 2020

(86) PCT No.: PCT/EP2020/084009
§ 371 (c)(1),
(2) Date: Feb. 7, 2023

(87) PCT Pub. No.: WO2022/028723
PCT Pub. Date: Feb. 10, 2022

(65) Prior Publication Data
US 2023/0320906 A1    Oct. 12, 2023

Related U.S. Application Data

(63) Continuation-in-part of application No. PCT/US2020/045458, filed on Aug. 7, 2020.

(51) Int. Cl.
*A61F 13/08* (2006.01)
*A61F 13/06* (2006.01)
(Continued)

(52) U.S. Cl.
CPC .............. *A61F 13/08* (2013.01); *A61F 13/06* (2013.01); *A61H 7/001* (2013.01); *G01L 1/142* (2013.01);
(Continued)

(58) Field of Classification Search
CPC . A61F 2013/0028; A61F 13/08; A61H 1/006; A61H 9/0092; A61B 17/132;
(Continued)

(56) References Cited

U.S. PATENT DOCUMENTS

| 8,221,340 B2 | 7/2012 | Farrow et al. |
| 10,378,975 B1 | 8/2019 | Sun |

(Continued)

FOREIGN PATENT DOCUMENTS

| EP | 2508124 A2 | 10/2012 |
| EP | 3076915 B1 | 6/2020 |

(Continued)

OTHER PUBLICATIONS

International Search Report and Written Opinion mailed Nov. 24, 2020 for International Application No. PCT/US2020/045458, 14 pages.

(Continued)

*Primary Examiner* — Thomas McEvoy
(74) *Attorney, Agent, or Firm* — Schwabe, Williamson & Wyatt, P.C.

(57) ABSTRACT

Arrangement for compression sensing between two objects, preferably for compression treatment, in particular compression therapy arrangement, comprising a first object, e.g. a compression garment adapted to exert external pressure on a second object, e.g. a body portion and at least one sensor device associated with the first object and having at least one pressure sensor for determining the external pressure, wherein the pressure sensor comprises at least one pressure (Continued)

circuitry, having a sensing impedance which is dependent on the external pressure and at least one reference circuitry having a reference impedance which is essentially independent from the external pressure, wherein a cumulative signal which is dependent on the external pressure and other external influences acting in the vicinity of the sensing impedance is derivable from the pressure circuitry and a reference signal which is essentially independent from the external pressures but dependent on other external influences acting in the vicinity of the reference circuitry.

17 Claims, 26 Drawing Sheets

(51) Int. Cl.
*A61H 7/00* (2006.01)
*G01L 1/14* (2006.01)
*G16H 40/67* (2018.01)
*A61F 13/00* (2006.01)

(52) U.S. Cl.
CPC ...... *G16H 40/67* (2018.01); *A61F 2013/0028* (2013.01); *A61H 2201/5074* (2013.01); *A61H 2209/00* (2013.01)

(58) Field of Classification Search
CPC ............ A61B 17/1322; A61B 17/1325; A61B 17/135; A61B 17/1355; A61B 5/02; A61B 5/02233; A61B 5/02208; A61B 5/02241; A61B 5/022
See application file for complete search history.

(56) References Cited

U.S. PATENT DOCUMENTS

| | | | |
|---|---|---|---|
| 2009/0055148 | A1 | 2/2009 | Gobet |
| 2010/0298895 | A1* | 11/2010 | Ghaffari .................. A61B 8/14 |
| | | | 607/116 |
| 2015/0297437 | A1 | 10/2015 | Neuenhahn et al. |
| 2016/0242964 | A1 | 8/2016 | Rapp et al. |
| 2018/0000651 | A1 | 1/2018 | Pan et al. |
| 2019/0167988 | A1 | 6/2019 | Shahriari et al. |

FOREIGN PATENT DOCUMENTS

| | | |
|---|---|---|
| KR | 10-1604431 B1 | 3/2016 |
| WO | 2010082993 A2 | 7/2010 |
| WO | 2019048638 A1 | 3/2019 |

OTHER PUBLICATIONS

International Preliminary Report on Patentability mailed Mar. 3, 2022 for International Application No. PCT/US2020/045458, 10 pages.

International Search Report and Written Opinion mailed Jul. 1, 2022 for International Application No. PCT/EP/2020/084009, 34 pages.

* cited by examiner a)

b)

a)

ARRANGEMENT FOR COMPRESSION TREATMENT, IN PARTICULAR COMPRESSION THERAPY ARRANGEMENT AND METHOD FOR OPERATING AND MONITORING THE SAME

CROSS REFERENCE TO RELATED APPLICATION

The present application is a 35 U.S.C. § 371 national phase entry application of, and claims priority to, International Patent Application No. PCT/EP2020/084009, filed Dec. 1, 2020, which is a Continuation-in-Part of International Patent Application No. PCT/US2020/45458, filed Aug. 7, 2020, the disclosures of which are hereby incorporated by reference in their entirety for all purposes.

BACKGROUND

Compression therapy may be applied in the treatment of edema which may be attributable to multiple pathologies. Two common but not exhaustive sources of edema in the lower extremities are chronic venous insufficiencies (CVI) and lymphedema. An approach for treatment and management of edema involves exerting external pressure through appropriate compression garments, like bandages, hosiery, straps, stockings or the like. Success of therapy greatly depends on proper and repeated application of compression to the affected body portions. Further, long term patient compliance/adherence of daily use at specified conditions, such as duration and demand of external pressure is important for maintenance of chronic edema.

BRIEF DESCRIPTION OF THE DRAWINGS

Exemplary embodiments of the invention are shown in the drawings wherein like reference numerals are referred to identical or equivalent features. In the drawings

FIGS. 10, 11 and 14 also show optional means for user input via the external device, the user input to be used for the monitoring of the operation of the compression therapy arrangement.

FIG. 21 illustrates a networked environment for the compression therapy arrangement.

DETAILED DESCRIPTION

Figure 1:
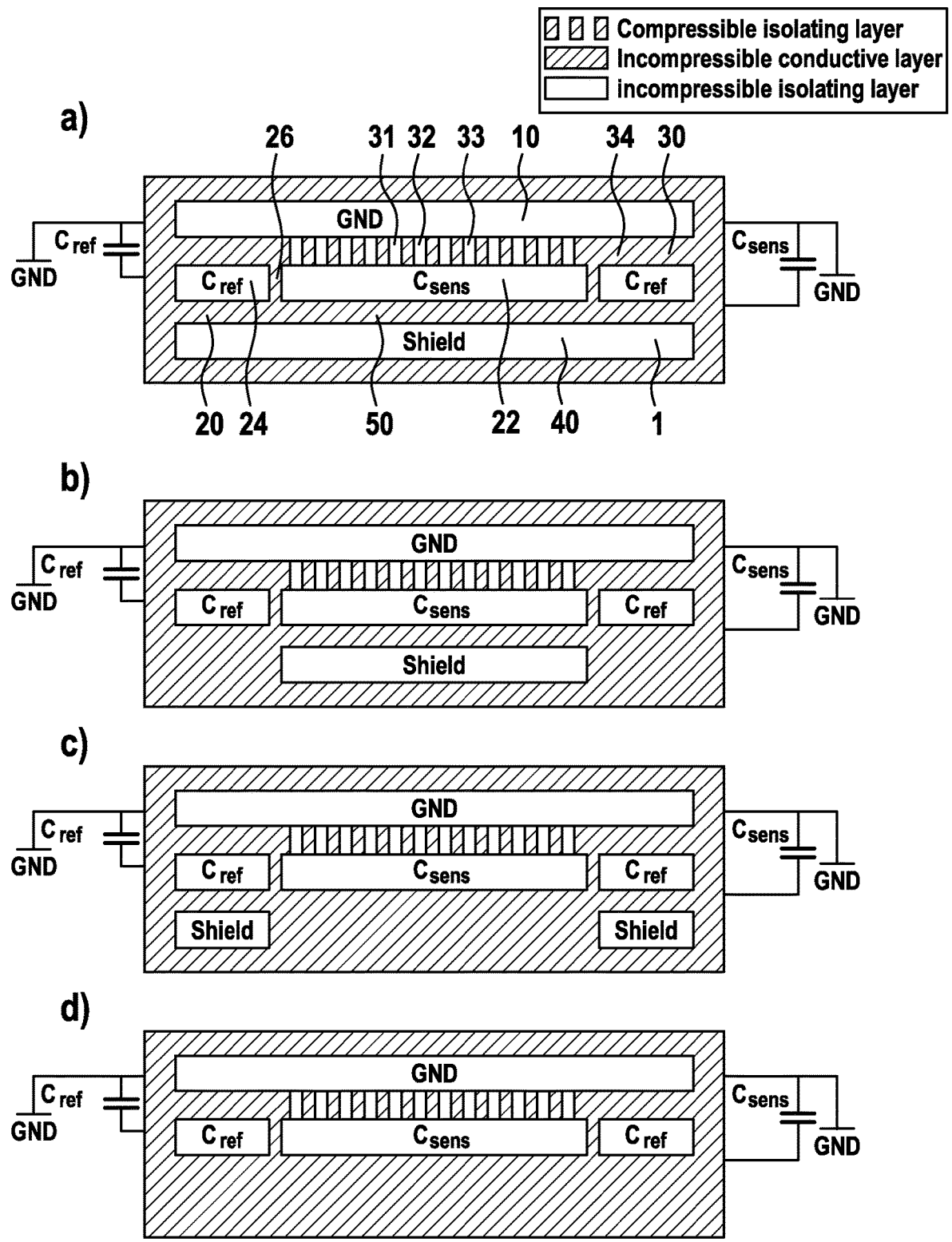
FIG. 1 illustrates a schematic cross-sectional view of the pressure sensor for an inventive compression therapy arrangement.

Embodiments relate to an arrangement for compression sensing between two objects, preferably for compression treatment, in particular a compression therapy arrangement comprising a first object, e.g. a compression garment, adapted to exert external pressure on a second object, e.g. a body portion, and at least one sensor device associated with a compression garment and having at least one pressure sensor for determining the external pressure and a compression garment for use in an arrangement for compression treatment.

As noted, compression therapy may be applied in the treatment of edema which may be attributable to multiple pathologies. In an approach to improve compression therapy it has been proposed to incorporate into the compression garment a pressure sensor which is capable of producing at least one pressure signal indicative of the external pressure and transmitting therapy signals corresponding to the pressure signals to an external device via appropriate transmitter means. This enables the patient and/or external medical practitioners to monitor compression therapy. In known compression therapy arrangements of this type, the pressure sensor may operate on the basis of pneumatic principles where the garment is provided with a pressure lumen and this pressure lumen is linked to an external device via an appropriate tube for establishing a fluid communication between the pressure lumen and the external device. In the external device the pressure in the sensor lumen is determined according to principles well known from blood pressure measurements. According to another approach, the garment is provided with a strain resistor or a capacitor having an electrical resistance or capacity which is dependent on the external pressure. While the pneumatic approach allows for determining external pressure with high accuracy, it requires constructional efforts and may be subject to damages caused by mechanical impact. On the other hand, the electrical approach allows for a simple and robust construction but in many cases lacks required accuracy of pressure determination.

In view of the above problems, it is the object of the present invention to provide an arrangement for compression sensing, preferably within the framework of compression treatment, in particular a compression therapy arrangement having a simple and robust construction while allowing accurate determination of the external pressure exerted on a body portion.

According to a first aspect of the invention, this problem is solved by an improvement of the known arrangements wherein the pressure sensor comprises at least one pressure circuitry having a sensing impedance which is dependent on the external pressure and at least one reference circuitry having a reference impedance which is essentially independent from the external pressure wherein a cumulative signal which is dependent on the external pressure and other external influences acting in the vicinity of the sensing impedance is derivable from the pressure circuitry and a reference signal which is essentially independent from the external pressure but dependent on other external influences acting in the vicinity of the reference impedance is derivable from the reference circuitry.

Essentially independent from external pressure means within this description and the claims that an external pressure of 1 atm. does not change the impedance or the reference signal by more than 10 percent compared to the values where no pressure is exerted.

The expression garment a used in this description and the claims covers all products which are capable of exerting external pressure, like bandages, stockings, straps, hosiery, compression shirts, e.g. sports shirts, etc. and combinations thereof.

Within this description and the drawings the expression signal covers any information, e.g. represented by digital values, as well as physical status values, e.g. electric potentials. Thus, a signal within the meaning of this description and the claims may be processed digitally and/or analog. Within the framework of this description and the claims a circuitry may consist of impedance.

This invention is based on the finding that the above mentioned problems regarding accuracy of determining external pressure when using the electric approach are mainly caused by the fact that signals derived from respective sensors are not only dependent on the external pressure but also on other external influences like temperature, moisture or external electric fields. When using a compression therapy arrangement according to this invention, such external influences may be compensated by making use of the reference signal which is affected only mainly by the external influences but not significantly by the external pressure. By appropriate calibration and evaluation algorithms the external pressure may be derived as a function of the pressure signal derived from the pressure circuitry and the reference signal derived from the reference impedance. On the other hand, the pressure sensor of the compression therapy arrangement according to this invention still is an electric sensor which does not induce complications by integration into the compression garment. Accordingly, the inventive arrangement allows for a simple construction while still ensuring accurate determination of the external pressure, applied by the garment, where a compression garment within the meaning of this description and the claims may as well be for example a conformable T-shirt, e.g. worn as underwear or as a kind of "second skin".

The term impedance as used in this description and the claims is meant to describe all types of electric circuitries comprising an ohmic resistor, a capacitor and/or an inductor wherein in the pressure circuitry at least one of an ohmic resistor, an inductor and a capacitor have an electric resistance, inductance and/or capacitance which is dependent on the external pressure, applied by the garment to the human body.

Within the framework of this invention, the pressure impedance may be arranged in close proximity to the reference impedance such that the external influences, like external electromagnetic field experienced by both of the pressure circuitry and the reference circuitry, are comparable.

The term close proximity in particular covers arrangements, wherein the spatial distance between the pressure impedance and the reference impedance is equal to or less than the largest extension of the pressure impedance and the sensing impedance as well as arrangements wherein the pressure impedance and the reference impedance overlap. The two sensors or impedances may share common structures or a shield electrode.

In an approach to further reduce the impact of external influences on the determination of the external pressure, the pressure impedance and the reference impedance may share common components, which common components experience essentially the same external influences.

In embodiments of the invention the sensing impedance and/or the reference impedance may comprise a resistor and/or an inductor.

In embodiments of the invention the pressure circuitry may comprise a sensing capacitor having a capacitance which is dependent on the external pressure and/or the reference circuitry may comprise a reference capacitor having a capacitance which is essentially independent from the external pressure. Use of a sensing capacitor and a reference capacitor enables compact construction while ensuring appropriate accuracy. In case the sensing capacitor is essentially composed of an at least partially conductive first electrode layer, an at least partially conductive second electrode layer, which may be arranged essentially parallel to the first conductive layer, and a dielectric layer arranged between the first electrode layer and the second electrode layer, the sensing capacitor may be realized by providing the dielectric layer between the electrode layers with a compressible sensing portion. When exerting an external pressure on a likewise obtained pressure sensor in the vicinity of the compressible sensing portion, the distance between the electrode layers is reduced to thereby change the capacitance of a capacitor formed by the conductive layers and the sensing portion of the dielectric layer.

In case compressibility of the sensing portion is obtained by composing the dielectric layer by a mix of air or another gas and a deformable material like silicone which is not compressible but conformable, the change of capacitance is also effected by the (partial) replacement of air in the sensing portion by the conformable dielectric material. This can be explained by the fact that a conformable material, like silicone, generally has a relative dielectric constant εr which differs from the dielectric constant of a gas, like air, having a relative dielectric constant εr=1.

In case the compressible sensing portion is realized by a mix of an incompressible, but conformable material and a gas, like air, it is possible to realize the sensing portion by a closed structure, wherein the gas is contained in a closed cavern and an open structure wherein the gas within the sensing portion is in fluid communication with ambient atmosphere. In a closed structure the sensing capacitor may have a capacitance which is influenced by changes of the inner pressure of the sensor which may result in a drift signal which may be proportional to the outer air pressure and/or change in the outer air pressure, which influences are hardly compensated by the reference capacitor which, as will be explained herein below, may not comprise a compressible dielectric layer.

On the other hand, the open structure may allow water to enter into the gas cavern of the compressible sensing portion. Given that the relative dielectric constant of water is about 80 at room temperature, a wet environment to be expected in the vicinity of a body portion may falsify the readings. Thus, the sensing portion of the dielectric layer may be at least partially delimited by a membrane that keeps water out of the compressible sensing portion, but allows for a gas exchange with the environment. In a further approach to adapt the properties of the pressure capacitor, the dielectric constant of the dielectric layer which may be at least partially composed of silicone, may be modified. Further, conductive properties of the conductive layers may be adapted as desired.

In general, the conductive layers may also be mainly composed of silicone which may be filled with conductive particles or nanoparticles like carbon nanotubes or metal powder (e.g. silver, titanium, copper, aluminum, carbon-black, graphen or the like). In order to allow for a variation of the distance between the conductive layers of the sensing capacitors, such conductive layers may have an elongation in the region between 10 and 400 percent, in particular between 50 and 300 percent, as may have the dielectric layer(s).

As explained herein before, the pressure circuitry and the reference circuitry may share common components. In case the pressure circuitry comprises a pressure capacitor and the reference circuitry comprises a reference capacitor, at least one of the first electrode layer and the second electrode layer may have a conductive sensing area forming the sensing capacitor and a conductive reference area separated from the sensing area by an insulating area and forming the reference capacitor, wherein the surface area of the sensing area facing the other electrode layer may essentially correspond to the surface area of the reference area facing the other electrode layer. In this case, the sensing capacitor and the reference capacitor may share in common the other electrode layer as a common component. By adapting the size of the conductive sensing area forming the sensing capacitor to the conductive reference area forming the reference capacitor, the capacitance of the sensing capacitor may be adapted to the capacitance of the reference capacitor to thereby facilitate compensation of external influences by combining the pressure signal and the reference signal.

As may be taken from the above explanation, the compressible sensing portion of the dielectric layer may be arranged between the sensing area and the opposing area of the respective other electrode layer. The sensing portion may have a columnar structure comprising columns made of a dielectric deformable, but incompressible material and voids formed between the columns and filled with gas, in particular ambient air. In case mechanical pressure is applied to the columns or pillars of the sensing portions of the dielectric layer, columns or pillars are reduced in height and get wider while still having the same volume. If the dielectric material has elastic properties, it may return to its original shape as soon as the mechanical pressure is reduced or completely eliminated.

In order to make the reference capacitor independent from the external pressure, the dielectric layer may be provided with an essentially incompressible reference portion arranged between the reference area and an opposing area of the respective other electrode layer. In this case the distance between the reference area and the opposing area of the respective other electrode is kept essentially constant even when exerting external pressure on the sensor to thereby leave the reference capacitance essentially unchanged even in case of exerting external pressure.

The distance between the reference area and the respective other electrode is typically kept smaller than the distance between the sense electrode and the respective other electrode. A preferred distance between the reference electrode and the other electrode is below the distance between the sense electrode and the respective other electrode under the maximum pressure applied to the ISS area, such that the reference area does not limit the pressure range of the sensor in the range that is of interest in the application. The typical ranges in the targeted compression therapy arrangement are between 10 and 120 mmHg. In order to reduce effects of an anisotropic spatial distribution of the external influences, it has been proven advantageous when at least one electrode layer has a central, preferable rectangular or circular sensing (reference) area and a circumferential reference (sensing) area at least partially running around the sensing (reference) area to thereby at least partially eliminate the effects of the spatial gradient in the external influences differing from the external pressure. In order to reduce the effects of the reference portion on the reduction of the distance between the conductive layers of the sensing capacitor, in a pressure sensor according to this invention the thickness of the reference capacitor in a direction perpendicular to the reference area may differ from the thickness of the sensing capacitor in a direction perpendicular to the sensing area wherein the reference capacitor preferably is thinner than the sensing capacitor.

In other embodiments of the invention, the sensing impedance, in particular sensing capacitor, and the reference impedance, in particular reference capacitor, are arranged side by side.

In a further approach to reduce the influence of external electromagnetic fields on the signals derived from the pressure sensor of a compression therapy arrangement according to this invention, the pressure sensor may further comprise at least one at least partially conductive shielding layer arranged on a side of at least one of the conductive layers, preferably the conductive layer comprising the sensing area and the reference area, opposite to the dielectric layer between the conductive layers and separated from the respective conductive layer by a further dielectric layer wherein means are provided to adapt the electric potential of the shielding layer to that of one electrode layer, preferable the electrode layer comprising the sensing area and the reference area. In this way, capacitive coupling of external electric fields to the pressure sensor may be reduced. Within the framework of this invention, the conductive layer comprising the sensing area and the reference area may be arranged on a side of the dielectric layer opposite to the body portion onto which external pressure should be exerted and/or the conductive shielding layer may be arranged on a side of the conductive layer comprising the sensing area and the reference area opposite to the dielectric layer between those conductive layers. In other words, the conductive shielding layer may be arranged such that the conductive sensing layer as well as the conductive reference area are shielded from external influences.

According to this invention, the sensing capacitor, the reference capacitor and/or the at least one shielding layer may be at least partially embedded in a dielectric embedding arrangement wherein the dielectric embedding arrangement may comprise a tunnel or gap optionally provided with a gas permeable but water impermeable membrane to allow for pressure compensation between the sensing portion of the dielectric layer and ambient pressure. In this way, the embedding arrangement may be formed such that it is essentially water impermeable and/or gas permeable.

According to this invention, the pressure sensor may be deformable and/or conformable, in particular conforming to the structure of the objects, in particular bendable. In this way it will be possible to adapt the shape of the pressure sensor to the shape of the body portion onto which external pressure should be exerted. The desired properties of the pressure sensor may be realized if at least one of the electrode layers, the dielectric layer, the shielding layer and the embedding arrangement is at least partially composed of a deformable and/or conformable (stretchable) material, in particular comprising silicone, as discussed herein before.

The pressure sensor may be connected to a supply device preferably via low ohmic wiring. In case a conductive wiring, in particular a low ohmic wiring is used, this may be electrically connected to at least one of the electrode layers via soft conductive glue, in particular silicone glue.

In order to reduce the influence of movement of the body portion on the result of determining external pressure, the wiring may be at least partially stretchable or conformable.

According to this invention, capacitances of the sensing capacitor and the reference capacitor may be determined by a capacitor compare technique. This technique may be implemented by providing a supply device which is capable of charging the sensing capacitor and/or the reference capacitor and discharging the sensing capacitor and/or the reference capacitor to a collecting capacitor having a predetermined fixed capacitance which preferably exceeds the capacitance of the sensing capacitor and/or the reference capacitor. By making use of the capacitor compare technique the external device may be capable of determining a first number of charge/discharge cycles needed to charge the collecting capacitor to a predetermined electric potential via the sensing capacitor after the collecting capacitor has been discharged as a cumulative signal, and determining a second number of charge and discharge cycles needed to charge the connecting capacitor to a predetermined potential via the reference capacitor after the reference capacitor and the collecting capacitor have been discharged as a reference signal and to determine the external pressure by processing the first and second number of charge and discharge cycles. In other words, the number of charges required to charge a large referenced capacitor for transferring the charges of the sensing capacitor is counted. This number of charges then may give direct feedback to the value of the sending capacitor. By processing this number of charges, the external pressure can be computed as it may be linearly dependent on the number of charges measures.

In determining the external pressure in embodiments of the invention it may be assumed that external influences induce a constant offset for the first and second number of charge and discharge cycles or in the number of charges counted. When a predetermined number of charge and discharge cycles for the reference capacitor is determined under reference conditions and calibration of the sensing capacitor is effected under the same reference conditions, the difference between the predetermined number and the second number of charge and discharge cycles presents the constant offset which may be subtracted from the first number of charge and discharge cycles to thereby obtain a number of charge and discharge cycles for the sensing capacitor which is only dependent on the external pressure as an input for determining the external pressure based on a calibration curve or function obtained under reference conditions.

In other embodiments it may be assumed that the offset of the first number is determined by the offset of the second number or of the reference measure obtained by the reference capacitor according to a known functional relationship, e.g. a linear function, a quadratic or cubic function, which functional relationship may be determined in a preparatory calibration process.

The pressure sensor of the inventive arrangement for compression treatment may be linked to transmitter means which is operable to transmit signals to an external device wherein such signals may comprise therapy signals corresponding to the external pressure. The external device may have processing means operable to process the therapy signals. The inventive arrangement may further comprise converter means, e.g. display means or speaker means, linked to the processor means and operable to generate a perceptible signal corresponding to the external pressure, e.g. a visual and/or audible representation and/or a vibrational representation of the external pressure. Further, storage means may be provided capable of storing pressure data corresponding to a plurality of external pressure values.

Input means may be linked to the processor means which may be operable to input external data, e.g. user data, device data, target data, etc. The inventive compression therapy arrangement may further comprise at least one temperature sensor, at least one moisture sensor, at least one bioimpedance sensor and at least one movement sensor, at least one acceleration sensor and/or at least one position sensor.

In an inventive method for operating an arrangement according to this invention, an external pressure is determined on the basis of a cumulative signal which is dependent on the external pressure and other external influences acting in the vicinity of the sensing impedance and a reference signal which is independent from the external pressure, but dependent on other external influences acting in the vicinity of the reference impedance which external pressure may be monitored within the framework of compression treatment or therapy.

According to a further aspect which may be combined with the first aspect, this invention is directed to providing a compression therapy arrangement and associated methods of operating and monitoring the same as well as a corresponding computer-readable medium and a corresponding computing system, which each help to improve compression therapy applied via a compression garment.

According to a further general aspect of this invention, a compression therapy arrangement is provided which comprises at least one compression garment adapted to exert external pressure on a body portion, at least one sensor device associated with the compression garment and having at least one pressure sensor capable of producing at least one pressure signal indicative of the external pressure and transmitter means linked to the at least one sensor device and operable to transmit a therapy signal corresponding to the pressure signal to an external device. Embodiments of the present invention enable monitoring of the compression garment.

According to another general aspect of this invention, a method for operating the compression therapy arrangement is provided, wherein a therapy signal is transmitted to an external device, such as a mobile communication device.

According to another general aspect of this invention, the compression therapy arrangement is used for the treatment of edema.

According to another general aspect of this invention, a method comprises: using at least one computer hardware processor to perform the following operations: obtaining an identifier of a compression therapy arrangement, the compression therapy arrangement including a compression garment; determining an operational state of a portion of the compression garment based on the obtained identifier; and generating instructions for displaying of an indicator of the determined operational state. Embodiments of the present invention assist the user in properly operating the underlying technical system of the compression therapy arrangement, in particular the compression garment.

According to another general aspect of this invention, a method comprises: using at least one computer hardware processor for performing the following operations: displaying one or more compression therapy set-up procedure screens that require user input; and displaying one or more compression therapy treatment screens that graphically illustrate in at least substantially real-time measured values of at least one operational parameter associated with a compression therapy arrangement, the compression therapy arrangement including a compression garment being used for a compression therapy. Embodiments of the present invention allow tracking values of one or more operational parameters of the compression therapy arrangement in real-time or substantially real-time, which provides the user with continued feedback about the operation of the underlying technical system of the compression therapy arrangement, in particular the compression garment.

According to other general aspects of this invention, a computer-readable medium and a computing system corresponding to the methods of these general aspects are provided.

The at least one computer hardware processor of these methods may be located in the external device mentioned above that is external to the compression therapy arrangement, preferably wherein the external device is a mobile communication device. The operational state and/or the measured values of the at least one operational parameter may be obtained based on the therapy signals received by the external device from the compression therapy arrangement.

According to this invention, proper application of compression therapy may be monitored via the external device, e.g. a mobile communication device such as a smartphone, a tablet computer or the like, by using an appropriate pressure sensor which is associated with the compression garment and adequate transmitter means (sensor device) which on the one hand is linked to the at least one sensor device and on the other hand is capable of transmitting a therapy signal to an external device. Within the framework of this invention it is also contemplated to integrate transmitter means into the sensor device. In other embodiments of the invention at least one sensor of the sensor device is separated from the transmitter means in order to increase patient comfort.

According to the invention, the pressure signal produced by the sensor device may be an analogous signal, while the therapy signal which is derived from the pressure signal and transmitted to the external device may be a digital signal. In other embodiments of the invention pressure signal and therapy signal may be both digital signals or even identical signals. Further, a wireless transmission path may be established between the transmitter means and the external device to thereby avoid limitations caused by wired signal transmission. On the other hand, a pressure signal may be transmitted to the transmitter device by wire to thereby avoid excessive efforts for realizing pressure devices. The sensor device and the transmitter means may be attached to a compression garment where releasable attachment is preferred, e.g. via a hook and loop fastener where the hook portion of the fastener may be associated with the sensor device, while the loop portion of the fastener may be associated with the garment; or by use of a snap mechanism. In other embodiments of the invention at least one sensor and/or the transmitter means are permanently affixed to the garment. In order to arrive at an appropriate support of the user the external device may have processor means operable to process the therapy signal which processor means may be realized within a smartphone or another mobile communication device.

In a further preferred embodiment of the invention the proposed compression therapy arrangement further comprises converter means linked to said processor and operable to generate a perceptible signal corresponding to the external pressure. Those converter means may comprise display means linked to said processor means and operable to display a visual representation of said external pressure. Alternatively or additionally, said converter means may comprise speaker means capable of generating an audible signal corresponding to said external pressure and/or vibration generation means capable of generating perceptible vibrations. Alternatively or additionally, a sound sequence and/or vibration sequence corresponding to the progress of compression therapy with time and/or duration of compression therapy may be produced. Storage means may be provided which are capable of storing pressure data corresponding to a plurality of external pressure values representing a plurality of pressure signals which for example may be obtained successively in pre-determined time intervals, to produce a graphic representation of a graph illustrating the progress of compression therapy with time and/or the duration of compression therapy which may be represented by the length of the graph displayed on said display means. Graphic representation or an audible representation of the progress of compression therapy may help to increase patient adherence towards educated targets. Storage means may be associated with and/or integrated in said transmitter means and/or said processor means.

In a further preferred embodiment of the invention input means are provided which are linked to said processor means operable to input external data, e.g. user data, device data, target data, etc. which may be used for various purposes.

In a particularly preferred embodiment of the invention, said pressure sensor comprises at least one capacitor having a capacity which is dependent on the external pressure. This allows to determine high-precision external pressure determination in case the at least one capacitor is integrated into an electric circuit further comprising a resistance and/or inductance, such as a RC circuit or a LC circuit, and the pressure signal is determined based on a frequency analysis, such as to obtain the natural frequency or eigenfrequency of the LC circuit. The pressure sensor may have a flexible construction to ensure comfort and accuracy of measurement on uneven anatomical surfaces e.g. circumference of small limb. At least one pressure sensor and/or said transmitter means may comprise a flexible circuit board which is integrated into or attached to the garment.

In a further preferred embodiment of the invention said sensor device additionally comprises at least one of a temperature sensor, a moisture sensor, a bioimpedance sensor system, a movement sensor, an Inertial Measurement Unit that measures movement and activity, an acceleration sensor and a position sensor to thereby open the possibility to monitor progress of therapy and the circumstances of therapy in more detail.

In case additional sensors are provided, said transmitter means is preferably operable to transmit to an external device at least one of a temperature signal derived from said temperature sensor, a movement signal derived from said movement sensor, an acceleration signal derived from said acceleration sensor and a position sensor derived from said position sensor. Also these additional signals are preferably transmitted to the external device via a wireless communication channel, optionally also as digital data.

In order to avoid an unauthorized or otherwise undesired link of said processor means which may be embodied by a smartphone or other mobile communication device to undesired compression therapy arrangements, in a preferred embodiment of the invention said operator means is operable to compare input data to device data indicative of said sensor device and/or said transmitter means, transmitted by said transmitter means. It may be further operable to enable operation of said processor means for controlling said display means to display graphic representations of any of the signals received from said transmitter means and derived from signals of the sensor device depending on the result of the comparison. Thus, in this preferred embodiment of the invention, only in case an appropriate verification process by comparing input device data to device data received from the compression therapy arrangement is successfully finalized the operation of the processor means in combination with specific compression therapy arrangement is allowed. In other words, only in the case where device information is sent with input data, i.e. the processor means is paired with the device, the processor may be successfully used. Obviously it is also contemplated within the framework of this invention to pare processor means with two or more compression therapy arrangements. In this case the user may be asked to select a specific garment via said input means. It may be tracked, which garment is being used and how long specific garments are used.

The above mentioned device data received from the compression therapy arrangement may be encoded in a code, such as a QR code or a bar code. The compression therapy arrangement may comprise the code, wherein the code encodes an identifier of the compression garment and wherein the code is scannable such that the identifier is obtainable through scanning of the code. The code may be attached to the compression garment or to a package thereof.

Use of a specific processing means may further depend on successful input and comparison of other user data, e.g. e-mail address, user name, and password.

Further, use of the processing means may be blocked in case the user does not acknowledge contraindications of the compression device by appropriate input upon respective request.

In a further preferred embodiment of the invention, the sensor device may visually indicate if the external compression is within, above or below a user defined target range i.e. RGB LED with yellow for below range, green within range, and red above range of 20-30 mmHg). This may further help to increase patient adherence to educated targets.

In a further preferred embodiment of the invention, said processor means may be operable to compare input target data with progress data derived from said stored pressure data. Said target data may be input for day and night, for specific time segments, for target activity level and depending on compression garment type (i.e. knit, chopped foam, wrap, bandaging). The comparison between input target data and progress data may also allow to enable display of specific items. For this purpose, processor means may be operable to enable processor functions, e.g. control of display means to display specific items depending on the result of the comparison between said target input data and said progress data. In this way, elements of gamification showing statistics in a nice and appropriately sized shape at the top of the display may be produced. Below statistics derived from the progress data locked badges may be displayed where it should be made sure that it is obvious that these badges are inaccessible. This may entice the user to unlock them every time they visit the application by appropriate use of the processor means and associated compression therapy arrangements.

Operation of the proposed compression therapy arrangement may be embedded into social networks. For this purpose, the processor means may be operable to transmit pressure data, user data, device data and/or target data to an external web server for sharing such data and information generated on the basis thereof between a community of users. For the same purpose, the processor means of the proposed compression therapy arrangement may be operable to receive web data from an external web server and to control said display means to display a graphic representation of said web data, e.g. together with a graphic representation of said pressure data and/or said external data. In this embodiment of the invention public profiles may be generated and discussion forums may be established. Further, said web data may contain educational content and reference information, links, occasional pop-up quick tips etc., which content may be associated with main processor means and not directly associated with the community.

In a further preferred embodiment, said processor means may determine garment life status. For this purpose, the processor means may evaluate pressure data, user data and device data to determine garment life based on parameters of wash cycles, usage durations, and other user factors. Garment life may then be graphically displayed.

In a further preferred embodiment, said processor means may be operable to receive usage data indicative of the period of usage of said compression garment and to compare said usage data to respective target data to thereby produce graphic representations indicative of the end of life of the garment, alert data in case compression is out of range, device out of range/not connected, reminder to wash garment, reminder to submit daily log entry or to do daily activity, etc. Under the aspect of data security it is preferred that this processor means is operable to transmit data to one or more external hosts wherein said processor means may be operable to divide and/or encrypt data for transmission to said at least one external host and to share data between multiple encrypted tables (e.g. patient profile table, device registration table, recorded data table). Such data may be accessible at least in part by customer service for telephone support and as appropriate data analysis tool.

In all embodiments of the invention, said compression garment may comprise at least one compression sleeve, and/or at least one compression bandage and/or at least one preferably adjustable compression strap. Examples of appropriate compression garments are shown for example in U.S.

Pat. No. 8,221,340 B2. The content thereof with respect to the construction of compression garments is incorporated herein by reference.

As may be taken from the above description, an inventive compression device for use in inventive arrangements for a compression treatment comprises a compression garment for exerting external pressure on a body portion and at least one pressure sensor for determining the external pressure. The inventive compression device may comprise two, three or more pressure sensors for determining the external pressure at different body portions.

While the pressure sensor may be integrated into the compression garment, at least one pressures sensor may be detachably fixed to the compression garment. In this way, inventive compression devices may be obtained by retrofitting existing compression garments. Further, the position of the pressure sensor with respect to the compression garment may be varied in accordance with the user's demands by detachably fixing the pressure sensor to the compression garment.

According to this invention, the at least one pressure sensor may be accommodated within a receptacle which preferably is detachably fixable to the compression garment, e.g. by means of a surface fastener, in particular a hook-and-loop fastener. In cases the hook-and-loop fastener is used, the hood-side of the hook-and-loop fastener is preferably arranged on the receptacle while the loop side of the hook-and-loop fastener is preferably arranged on a surface of the compression garment. In this way, unnecessary irritation of the body portion by the surface fastener may be at least reduced if not avoided. Further, the hook portion may cooperate with an existing structure of the compression garment, e.g. a compression bandage comprising a textile fabric The receptacle may be formed by two layers, in particular fabric layers accommodating there between the pressure sensor. The pressure sensor may be fixed to one of the fabric layers, e.g. by stitching and/or use of adhesive or other appropriate fixing means.

As discussed herein before, the pressure sensor may be linked to supply means via conductive wiring. Such conductive wiring may also be accommodated within the receptacle. The supply means may be fixed, preferably releasably fixed, to the compression garment, e.g. by a surface fastener, in particular a hook-and-loop fastener. In this case it is preferred that the supply means is arranged on a surface of the compression garment opposite to the body facing surface. This may help to avoid irritation of the body portion by the supply means. The supply means may be releasably fixed to the conductive wiring by appropriate connector means, e.g. a plug and socket connector.

In case the compression garment comprises a central spine and bands extending from opposite edges of the central spine as shown in US 2011/0218473 A1, at least one pressure sensor may be arranged on a body facing surface of the central spine and/or the receptacle may extend parallel to the central spine and may be folded back over at least one edge of the central spine to thereby protect the conductive wiring also on the surface of the pressurizing means opposite to the body facing surface and to fix the receptacle on a side of the pressurizing means opposite to the body facing surface.

According to a further aspect this invention relates to the use of an arrangement of conformable impedance sensors named impedance sensor system (ISS), consisting mainly of one or multiple conformable impedance sensors that are constructed with conformable material layers that are partially shared by the individual sensors in an inventive arrangement, preferably an arrangement for compression treatment, in particular compression therapy, as described hereinbefore. The ISS is connected to read out electronics and/or supply and transmitter means that is placed at a distance (typically in the range of 5 to 35 cm) from the ISS and physically connected with electrical wires that may be stretchable or only bendable. This device reads out the information and may have a user interface which in most cases is minimalistic (e.g. a small number of buttons and a set of RGB LEDs and a vibration feedback device) This electronic unit may be wirelessly connected and is e.g. accessible via mobile device application software that runs e.g. on a mobile phone, tablet, pc or similar device as well as other embedded devices that act upon the received data. The ISS can act as a network of sensors in case the information of several ISS devices is collected by the same mobile device software at close to the same time. It is as well possible the several ISS are physically connected to one supply and transmitter means and/or read out electronics that reads their data and connects to an associated device that runs a mobile device application software. In embodiments the ISS may have at least two layers, each with an impedance, with at least one impedance being sensitive to compression and at least a second impedance being significantly less sensitive to compression but being sensitive to stretch and external influences.

In order to categorize the wording used to classify sensitivity: We consider a sensor being sensitive to compression, once at least 10% of the sensor impedance changes with an applied pressure. We further consider a significantly less sensitive sensor to compression, where less than 1% of the impedance changes according to compression. We consider a sensor being sensitive to external influences, once more than 5% of the impedance changes according to external influences. We further consider a sensor being sensitive to stretch, once at least 10% of the sensor impedance changes with a stretch of the sensor.

Today's technologies are very powerful with respect to sensing capabilities, especially when we think of pressure sensors based on silicon, formed with micromachining techniques or based on ceramic materials that are strongly piezo-resistive or piezoelectric. These sensors are precise when they can be applied flat on a surface. When measured on a curved surface however, these technologies fail as they are strongly influenced by bending and readings are falsified or cannot be done. The same applys for measurements in 3 dimensional shapes. The issue here is that a bendable sensor can be bent, but if we have a three dimensional sensor and bent it, the top of the sensor would need to stretch while the bottom of the sensor would need to compress. As this is not possible, the shape change introduces stress and three-dimensional change of the dimensions and a strong sensor reading due to the implied mechanical stress that is picked up by the sensors. In contrary to this the conformable sensor of the ISS is conceived with conformable materials that allow for stretch. The sensor is built in several conformable layers that interact with each other. The high stretch-ability in the range of typically 10 to ca. 400% combined with a potentially low stretching force allows, for example, in the case of a capacitive sensor that consists of two quasi two dimensional plates (that are very thin: for example less than 100 um) that are separated by a stretchable dielectric layer that may even consist of different materials (see embodiment of the pressure sensor of the ISS) results in an allowance for one plate to bend and stretch, while the plate may simply conform to the curved shape on which one would like to measure. In this case the dielectric and the electrode that is away from the body simply stretches and a reading can be done when the sensor system is pressed against the curved surface.

With these characteristics the ISS may be used between the human body and a garment where it measures and the pressure that is applied from the garment to the human body. This is even possible when the shape of the body changes during the measurements, as the soft sensor follows movement of the body and the implied change of shapes caused by the garment being in contact with the body in different areas, for example in sports shirts to measure the pressure exerted by a compression.

In a second configuration, the ISS can be configured as a strain sensor where one sensor element is implemented as a stretch sensor and a second element may be configured such that it is not significantly sensitive to stretch. To act as a one dimensional stretch sensor, the "strain sensor impedance is implemented as a long ribbon, for example 20-30 cm of length and for example only 0.5 to 3 cm in width. This configuration is highly sensitive to stretching forces along the length of the sensor and barely sensitive to forces in the width direction. Combined with the intrinsic force of the sensor that works against the mechanical stretch that is low in the length direction compared to the force in the width direction of the impedance sensor structure, the sensor is highly sensitive in one direction only. It may be combined with a second element that could be highly sensitive to stretch in a second space direction for example an element that stretches out in a 90 degree angle to the first stretch sensor in question and even combined with further stretch sensors in different space directions. One implementation can be such that at least one impedance is sensitive to stretching and at least one other impedance is not sensitive to stretching or not stretched by design of the attached fabric or garment. This way the ISS may be used as a stretch sensor in textile garments measuring elongations.

In the following section technical aspects are described with some more detail.

1. The ISS arrangement allows to compensate for external influences, which might disturb the measurement of the applied pressure in the described application scenarios, all while having a soft and conformable structure where all materials used in the main sensor area are conformable. Only the wiring that connects to the sensor at a specific area may be realized with metallic threads or similar electrical conductors, but may as well be of a conformable nature.
2. In the first configuration of the ISS it comprises at least one sensing impedance, which is sensitive on the external pressure and at least one other impedance, which is significantly less sensitive to external pressure and both impedances are sensitive to external electric fields or stretch wherein a cumulative signal which is dependent on the external pressure and other external influences in the vicinity of the sensing impedance is derivable from the pressure sensitive impedance and the other impedance. The second impedance of the ISS can be considered a reference Sensor.
3. An active shield in form of an additional electrode layer (conductive layer) is used to keep the influence of external electric fields away from the inner sensor structure. Therefor the active shield electrode is on the opposite side of the ground electrode, while the ground electrode may be common to the first and the second impedance in the ISS. An electrical potential is applied (or driven onto) the shield layer while reading out the sensor information. The electrical potential that is applied corresponds closely to the potential of the sensor electrode that is read out. The sensor electrode(s) is separated from the shield electrode by an insulation layer. Having the same (or a close by-) electrical potential on the sensitive electrode as well as on the shield electrode, the capacity among those two electrodes does not play a role and is close to zero. By construction the active shield allows to make the sensor electrodes that are situated under the shield electrode and above the ground electrode, while the shield electrode and the ground electrode cover most of the active electrodes area of the sensor electrodes (the contact areas may be an exception), the sensor information that is read out is nearly insensitive to external fields in the direction of the shield electrodes and in a certain frequency level (while it is made sure that the readout frequency is within the effective frequency band where the electrical fields are effectively equalized by the active shielding mechanism). The ISS uses the active shield layer to either prevent being sensitive to changes of $E_r$ in the near field of the sensor or to do exactly the opposite to measure significant changes in the surrounding electrical fields. In embodiments in which the shield electrode is used to measure the changes in the external fields in the vicinity of the ISS, an approaching object that has a high $E_r$ can be detected and this effect can be used. In such applications, the device may be considered a capacitive proximity sensor.
4. Compression sensitivity: The pressure sensitive impedance is essentially composed of an at least a partially conductive first electrode layer, an at least partially conductive second electrode layer, which may be arranged essentially parallel to the first conductive layer, and a dielectric layer arranged between the first electrode layer and the second electrode layer, the sensing capacitor may be realized by providing the dielectric layer between the electrode layers with a compressible medium. When exerting an external pressure on a likewise obtained pressure sensor in the vicinity of the compressible medium, the distance between the electrode layers is reduced. The change in distance between the electrodes leads to a change of the capacitance of a capacitor formed by the conductive layers and the compressible medium of the dielectric layer.

In the first implementation of the ISS the compressibility of the sensing portion of the first impedance is obtained by composing the dielectric layer by a mix of air or another gas and a deformable material like silicone which is not compressible but conformable, the change of capacitance is also affected by the (partial) replacement of air in the sensing portion by the conformable dielectric material. This can be explained by the fact that a conformable material, like silicone, generally has a relative dielectric constant $E_r$, which differs from the dielectric constant of a gas, like air, having a relative dielectric constant $E_r=1$.

5. Stretch sensitivity: The stretch sensitive impedance is essentially composed of an at least partially conductive first electrode layer, an at least partially conductive second electrode layer, which may be arranged essentially parallel to the first conductive layer, and a dielectric layer arranged between the first electrode layer and the second electrode layer, the sensing capacitor may be realized by providing the dielectric layer between the electrode layers with an incompressible but conformable medium. When exerting an external stretching force, the incompressible medium will stretch and keep it overall volume constant which leads to an increase in size (lateral dimensions) and a decrease in the distance between the two conductive layers such that the capacity will increase as well as the electrode resistance does.

6. Sensor matrix or array: The ISS can be extended to a sensor matrix consisting of multiple ISS attached to each other. This matrix structure allows to give the additional spacial information in the course of compression therapy. This way the compression information can also be localized.

The pressure sensor shown in FIG. 1 comprises a first conductive layer 10, a second conductive layer 20, a dielectric layer 30, disposed between the first conductive layer 10 and the second conductive layer 20, and a conductive shielding layer 40 disposed on a side of the second conductive layer opposed to the dielectric layer 30 and separated from the second conductive layer by a further dielectric layer 50. The first conductive layer 10, the second conductive layer 20, the dielectric layer 30, the shielding layer 40 and the second dielectric layer 50 are as a whole embedded in a dielectric material.

The first conductive layer, the second conductive layer and the shielding layer extend in essentially parallel planes. The second conductive layer 20 comprises a central sensing area 22 and a circumferential reference area 24, running at least partially around the sensing area 22 and separated from the sensing area 22 by an insulating area 26. The dielectric layer 30 comprises a compressible sensing portion 32 and an incompressible reference portion 34, wherein the compressible sensing portion 32 is disposed between the sensing area 22 and the first dielectric layer 10 and the incompressible reference portion 34 is disposed between the reference area 24 and the first conductive layer 10.

The compressible sensing portion 32 of the dielectric layer 30 comprises a pillar structure formed by pillars 33 which are separated by air-filled voids 31. Each pillar may have a circular cross section having a diameter of 5 mm or less and/or 1 mm or more, in particular about 2 mm, and a height of 1 mm or less and/or 0.1 mm or more, in particular about 0.3 mm. The height of the pillar may be smaller than the diameter thereof. When exerting an external pressure on the pressure sensor shown in FIG. 1 in a direction perpendicular to the conductive layers 10 and 20, pillars 33 are compressed and widened in a direction parallel to the conductive layers 10 and 20 to thereby fill part of the volume previously occupied by ambient air between the pillars. In this way, the capacitance of the sensing capacitor formed by the first conductive layer, the sensing area 22 of the second conductive layer and the sensing portion of the dielectric layer 30 is modified. On the other hand, the external pressure exerted on the sensor does not substantially affect the capacitance of a reference capacitor formed by the first dielectric layer 10, the circumferential portion 24 of the second conductive layer 20 and the incompressible reference portion 34 of the dielectric layer 30. External influences of external electromagnetic fields are shielded by shielding layer 40 held on the same electric potential as the second conductive layer 20.

Figure 2:
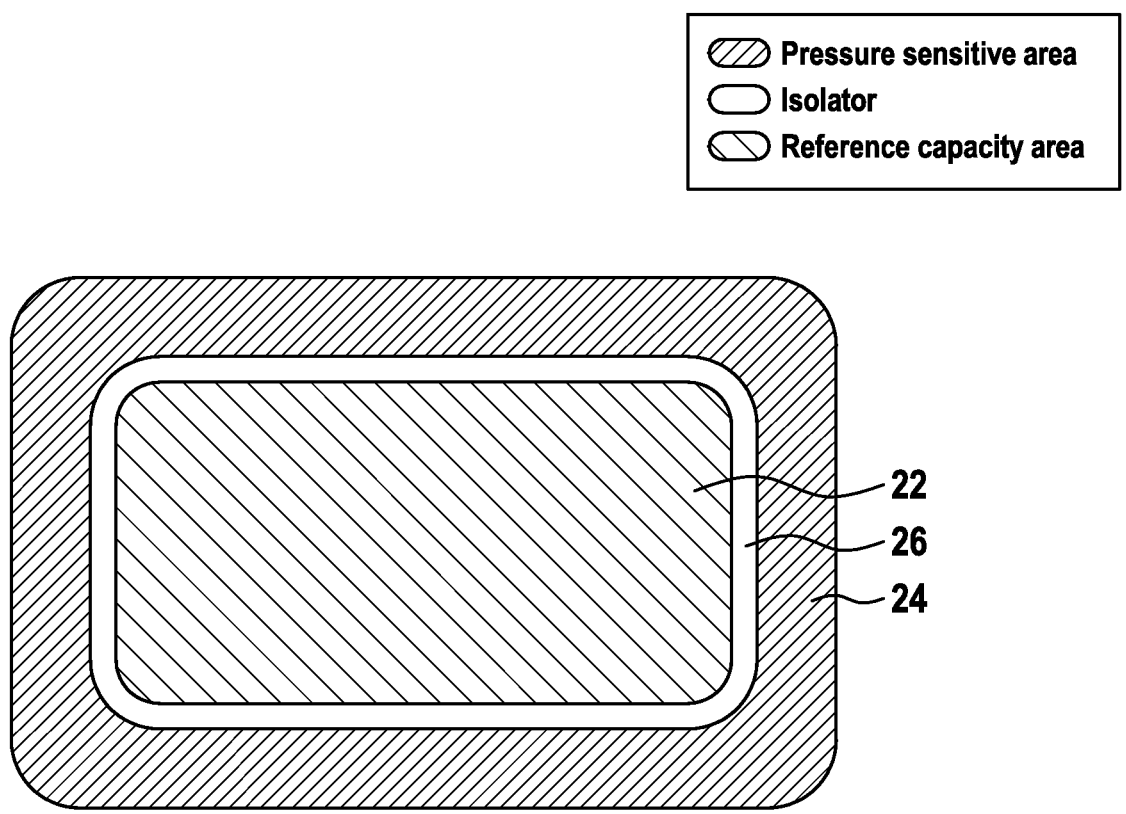
FIG. 2 illustrates a schematic illustration of a conductive layer comprising a sensing area and a reference area of the pressure sensor shown in FIG. 1.

The structure of the second conductive layer 20 is illustrated in more detail in FIG. 2. It comprises a central, essentially rectangular portion 22 and a circumferential portion 24 running around the central portion 22, which circumferential portion 24 is separated from the central portion 22 by insulating material 26.

All layers of the pressure sensor shown in FIG. 1 may be formed by silicone which is partially filled with conductive material in the vicinity of the first conductive layer 10, the second conductive layer 20 and the shielding layer 22. The thickness of conductive layers may be selected to be within the range between 100 µm and 200 µm. The silicone may have an elongation at break of between 100 and 200 percent. The thickness of the sensor may be within the range of 0.3 to 5 mm, in particular 0.5 to 2 mm.

Figure 3:
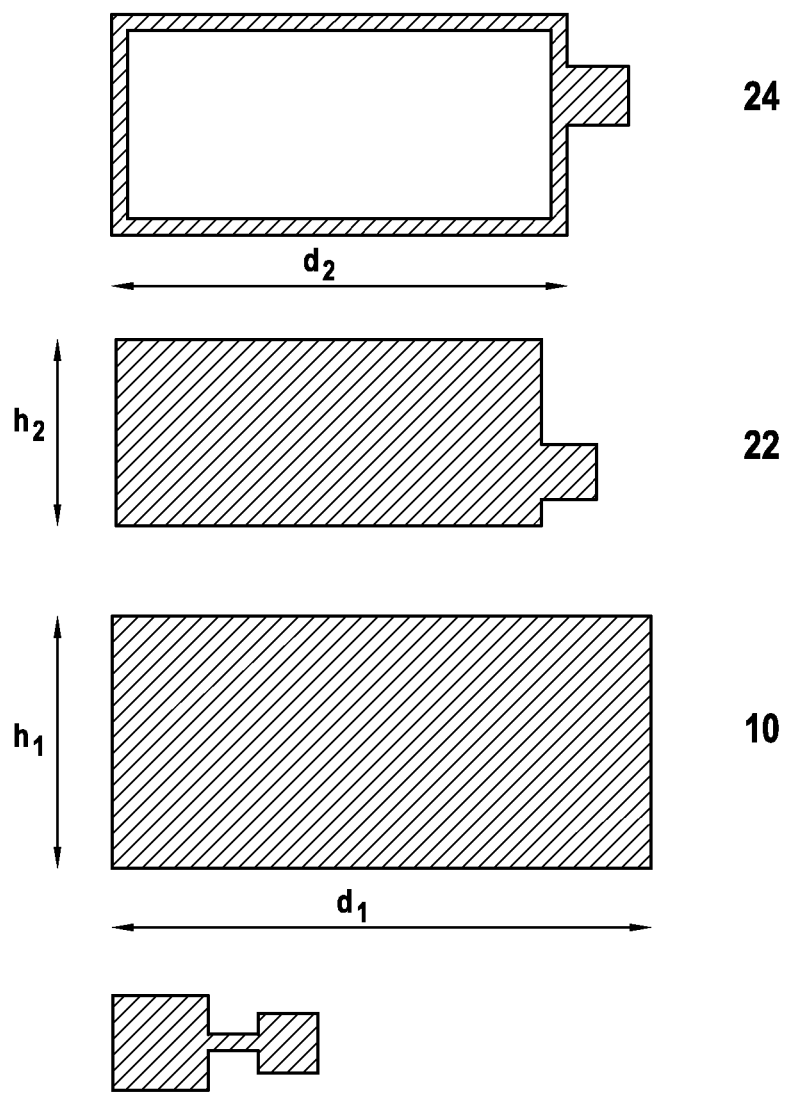
FIG. 3 illustrates schematic views of the first conductive layer, the second conductive layer and the shielding layer of the pressure sensor shown in FIG. 1.

In the exemplary embodiment depicted in FIG. 3 the conductive portion of conductive layer 10 may have a width d1 of about 64 mm and a height h1 of about 31 mm. The sensing area 22 may have a width d2 of about 61 mm and a height h2 of about 28 mm. The conductive area encircling the sensing area 22 may have an outer width of about 63.7 mm and an outer height of about 30.4 mm.

Figure 4:
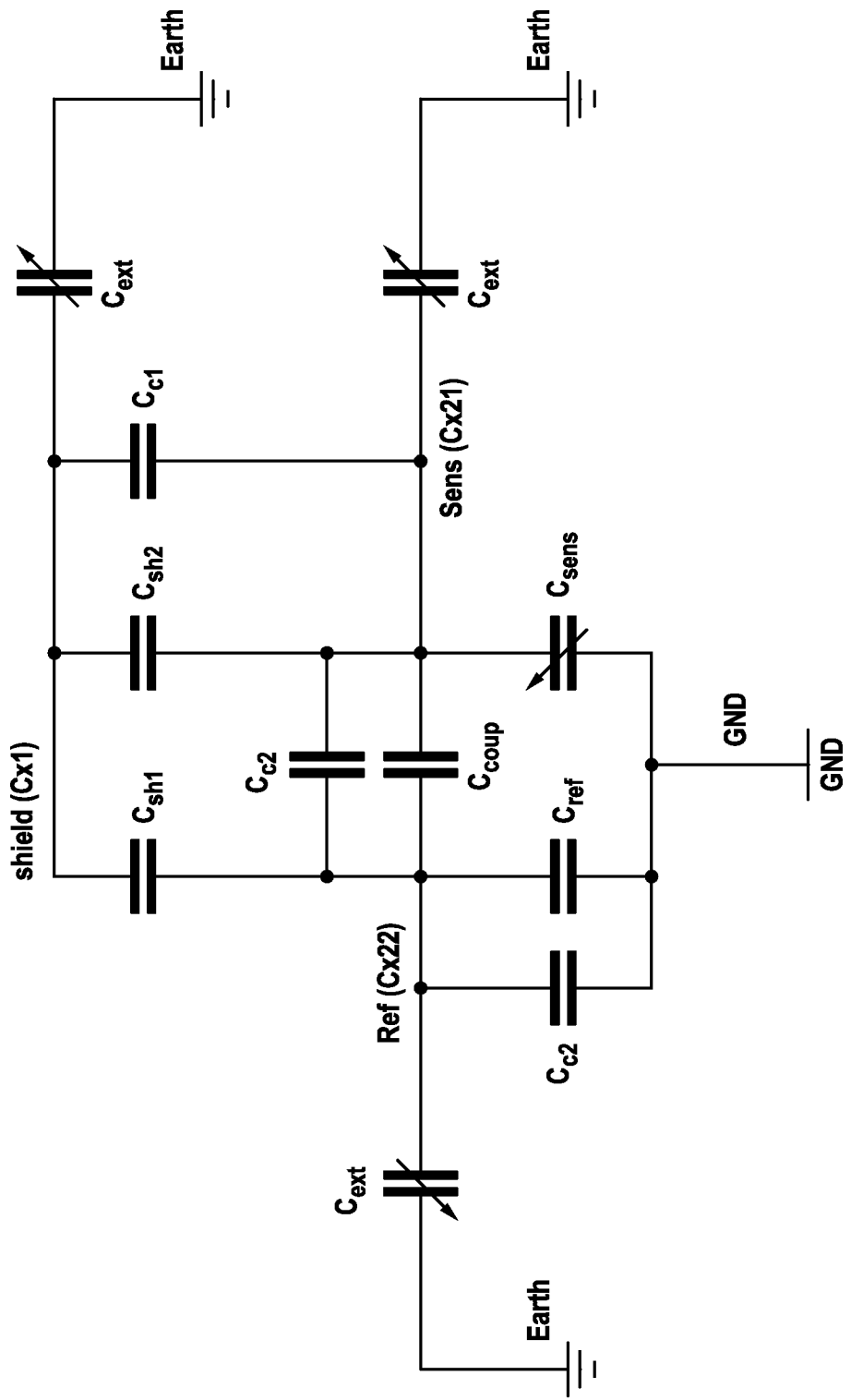
FIG. 4 illustrates an equivalent circuit diagram of the pressure sensor shown in FIG. 1

For determining the pressure dependent capacitance of the sensing capacitor, this sensing capacitor is loaded via input sense shield (Cx21) in the equivalent circuit diagram of FIG. 4 and discharged to a collecting capacitor (not shown). This charge/discharge cycle is repeated until a predetermined potential of the collecting capacitor is detected. The number of charge and discharge cycles needed presents a cumulative signal within the context of this description and the claims and is stored as a first number. In determining the capacitance of the reference capacitor Cref in the equivalent circuit diagram of FIG. 4, the reference capacitor is charged via input Ref (Cx22) in FIG. 4 and discharged to the collecting capacitor after this collecting capacitor has been completely discharged. This charge and discharge cycle is repeated until the collecting capacitor is charged to a predetermined potential. The number of charge and discharge cycles needed to load the collecting capacitor via the reference capacitor presents a reference signal within the context of this information and the claims and is stored as second number. This second number is compared to a reference number obtained by charging and discharging the reference capacitor under reference conditions until the collecting capacitor reaches the predetermined electric potential. The difference between the second number and the reference number is subtracted from the first number to thereby obtain an input number for determining the pressure based on a predetermined calibration curve obtained for the sensing capacitor Csens.

Figure 5:
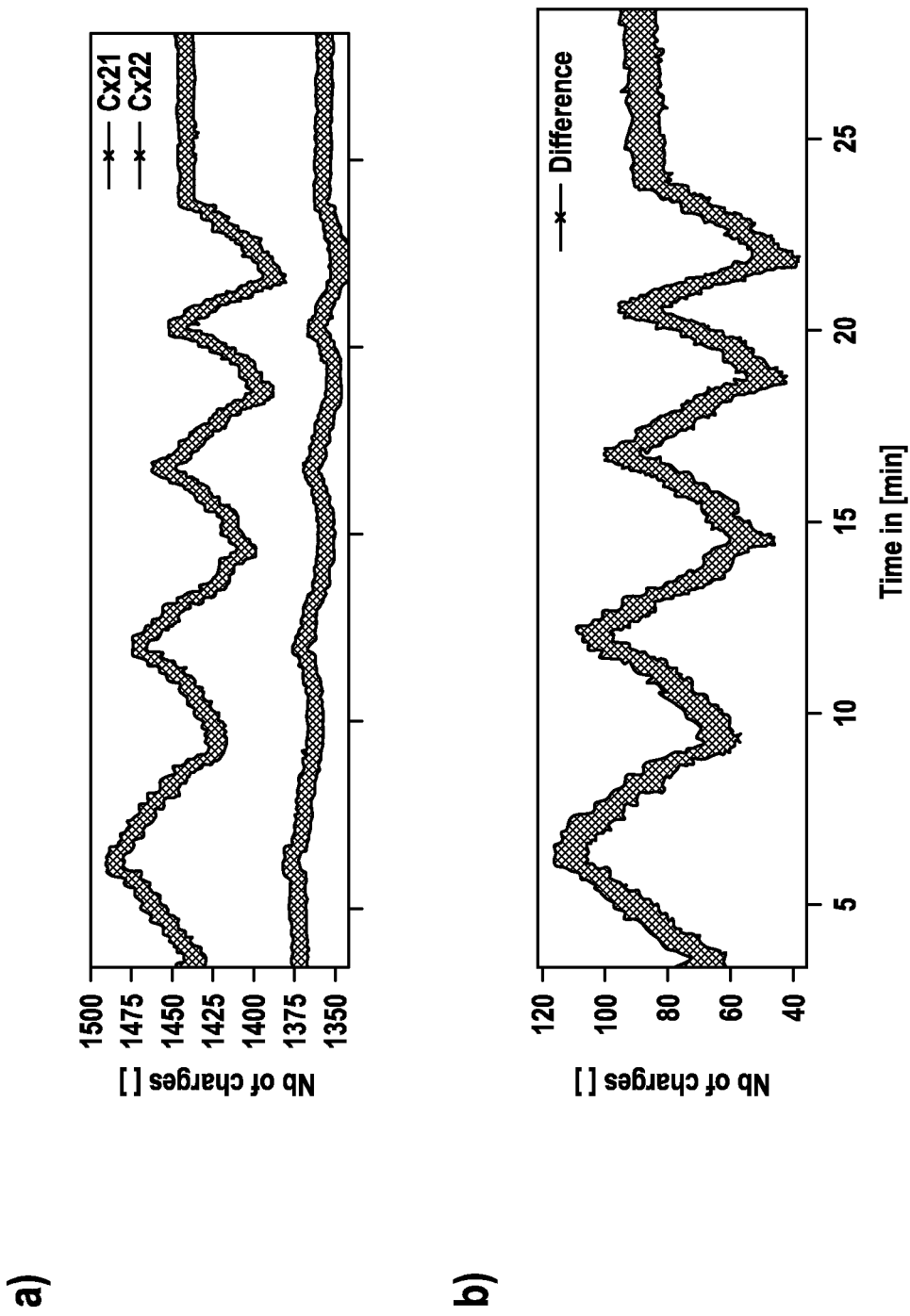
FIG. 5 illustrates an inventive method of determining external pressure.
Figure 5:
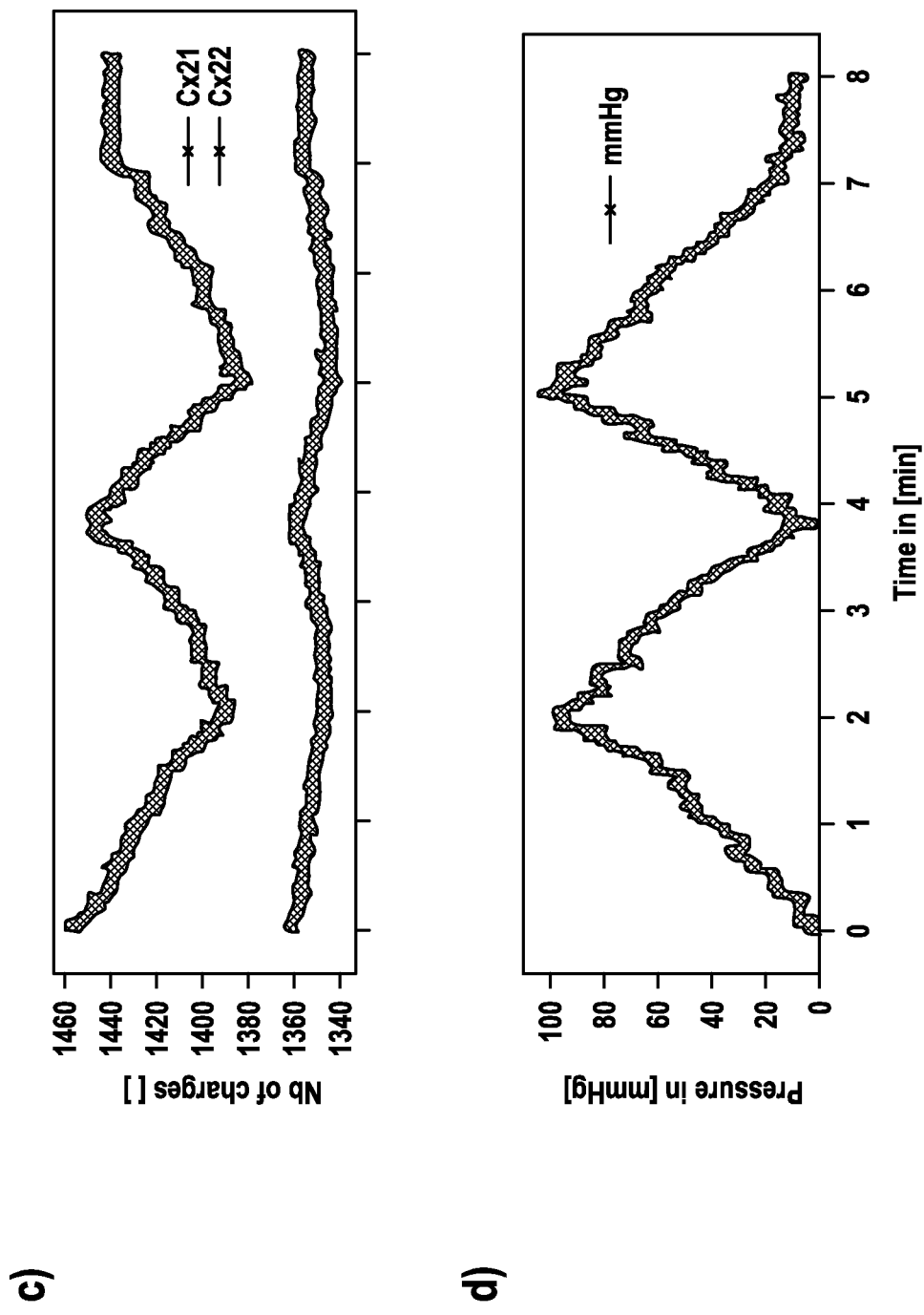

FIG. 5 illustrates how an external pressure is determined by making use of an inventive compression therapy arrangement. FIG. 5a) shows how the number of charge and discharge cycles presenting a cumulative signal changes when increasing and decreasing external pressure within the range of from 20 to 100 mmHg in the upper graph. The lower graph in FIG. 5a) shows the number of charge and discharge cycles determined for the reference capacitor as the reference signal for respective external pressure values. FIG. 5b) shows the difference between the cumulative signal and the reference signal. FIG. 5c) illustrates the last two signal periods of FIG. 5a) and FIG. 5d) illustrates the absolute pressure values obtained by using the difference between the cumulative signal and the reference signal shown in FIG. 5b) as an input for a predetermined calibration curve.

It is seen from FIG. 5d) that it is indeed possible to calculate from the first number of charge-discharge cycles (cumulative signal) and the second number of charge-discharge cycles (reference signal) absolute pressure values with high accuracy.

According to this invention the pressures sensor as schematically illustrated in FIGS. 1 to 3 may be attached to a compression garment such that the first electrode layer faces the body portion to which an external pressure should be exerted and the external pressure is exerted onto that body portion via shielding layer, the second conductive layer, the electric layer and the first conductive layer.

Figure 6:
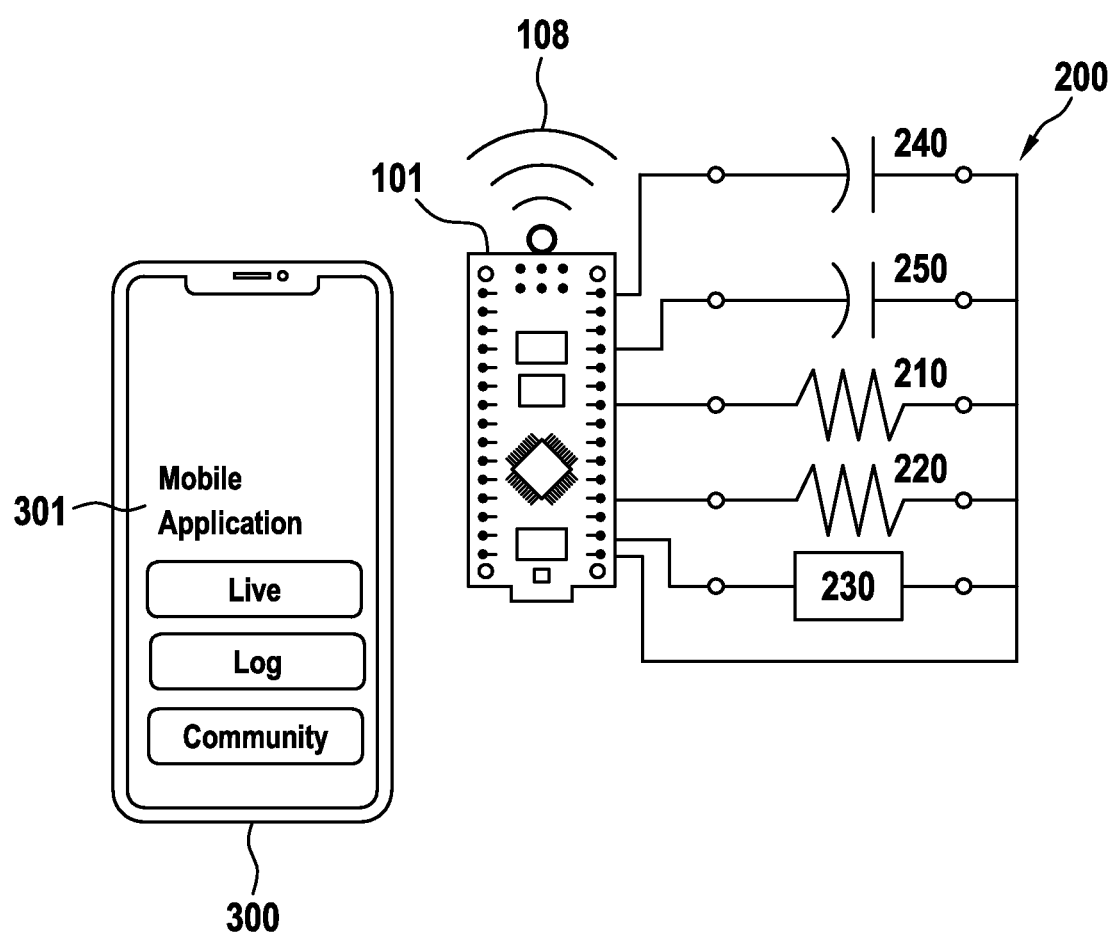
FIG. 6 illustrates a schematic representation of an exemplary embodiment of a compression therapy arrangement according to the invention.
Figure 7:
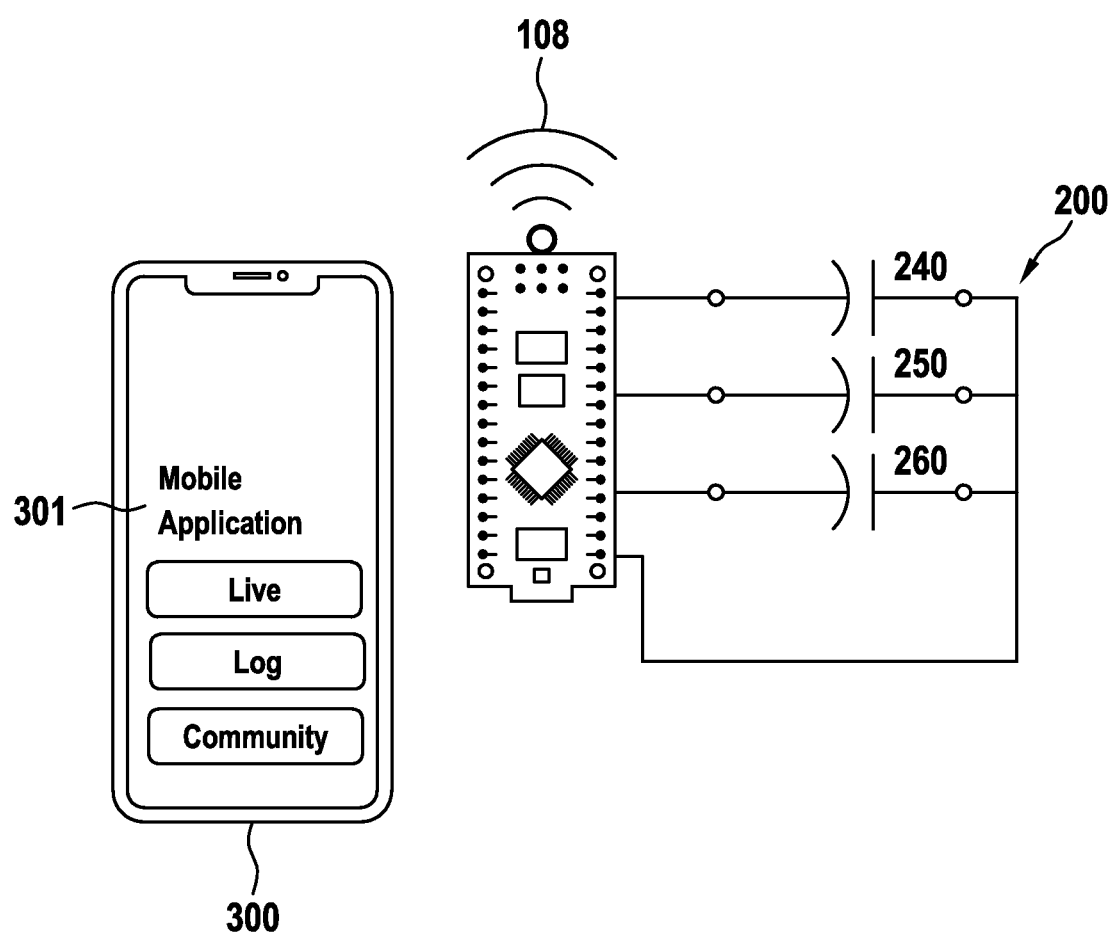
FIG. 7 illustrates a schematic representation of a second exemplary embodiment of a compression therapy arrangement according to the invention.

The compression therapy arrangement of each of FIG. 6 and FIG. 7 comprises a compression garment 100 adapted to exert external pressure on a body portion 120, at least one sensor device 200 associated with the compression garment 100 and having at least one pressure sensor 240, 250, 260 capable of producing at least one pressure signal indicative of the external pressure and transmitter means 100 linked to the at least one sensor device 200 and operable to transmit therapy signals 108 corresponding to the pressure signals to an external device 300. Each of the pressure sensors may be realized according to FIGS. 1 to 4.

The compression therapy arrangement shown in FIG. 6 comprises the sensor device 200 and the transmitter means 100 linked to the sensor device and to the external device 300, such as a mobile communication device, which may be realized by a smartphone and usable as graphic user interface for the compression therapy arrangement. The sensor device 200 of FIG. 6 may exemplary comprise one or more resistive sensors 210, 220 and/or one or more sensors 230 which are mainly based on additional or other physical processes such as inductive sensors, each linked by wire to the transmitter means and one or more capacitive pressure sensors 240 and 250, also linked by wire to the transmitter means 100. Sensor 210 may be a temperature sensor, sensor 220 may be a moisture sensor, and sensor 230 may be a bioimpedance sensor system, a movement sensor, an acceleration sensor or a position sensor.

Further to comprising transmitting elements, transmitter means 100 may comprise additional circuitry for deriving temperature and/or pressures signals from sensor device 200, e.g. inductive elements and frequency analyzer elements for deriving pressure value from pressure dependent values, such as capacity values of capacitors 240 and 250.

Figure 8:
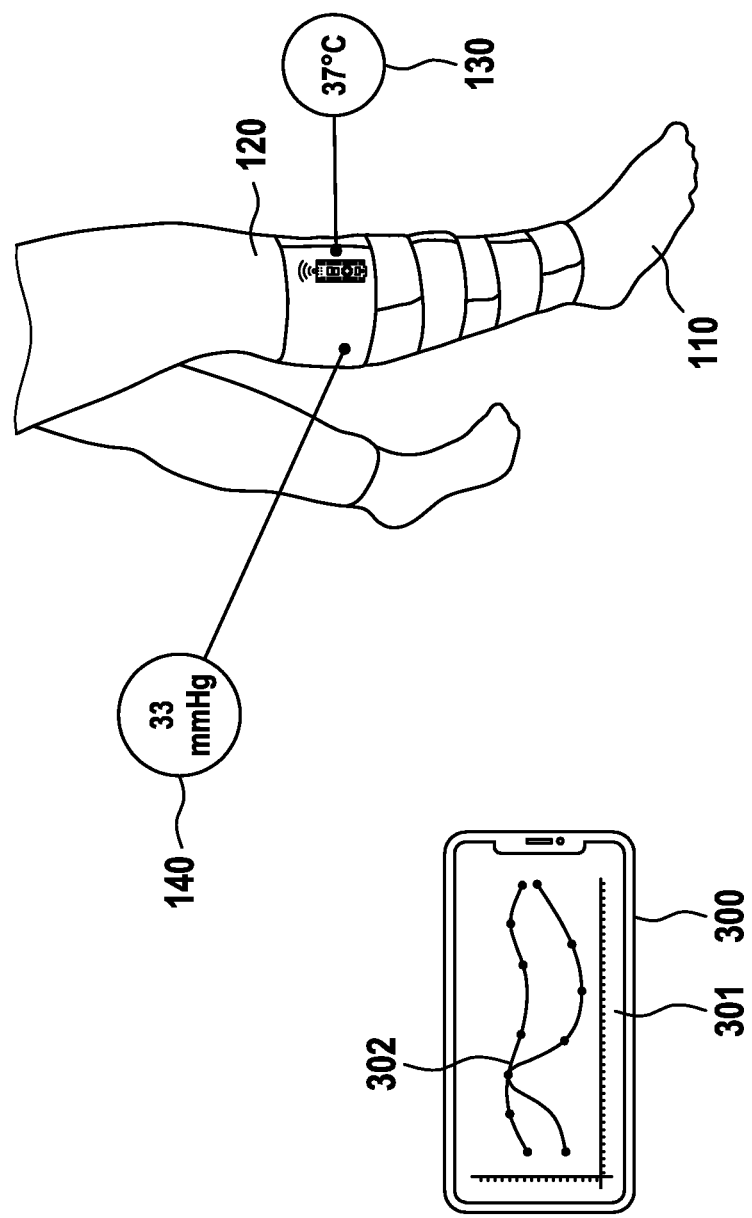
FIG. 8 shows the arrangement according to FIG. 6 in actual use.

As shown in FIG. 6 the external device 300 comprises converter means realized by a display which display may also be used as input means for inputting user data and user commands. The external device 300 may also be used as a web client communicating with an external entity, such as third party component 1003 that may be a server, web interface and/or another mobile application, or such as database 1001 of FIG. 15. The external device 300 may have installed thereon an application 301, such as a mobile application (app), which is capable to generating an indicator, such as indicator 302 in FIG. 8, providing a graphic representation of pressure-related data, such as in form of one or more graphs illustrating development of current pressure 14 and/or temperature 13 level.

The embodiment shown in FIG. 7 mainly differs from the embodiment illustrated in FIG. 6 in that it comprises a sensor device 200 having three capacity pressure sensors 240, 250 and 260, each linked by wire to transmitter means 101.

According to FIG. 7 temperature sensor 210 (not shown) and three highly flexible pressure sensors 240, 250, 260 are attached to or integrated into a compression garment or bandage. Temperature and pressure signals are transmitted via transmitter means to external device 300 which is capable of storing a plurality of temperature and/or pressure data and generating a graphic representation of pressure data and external data as a graph illustrating development of pressure levels 140, 150, 160 and/or temperature level 130.

Figure 9:
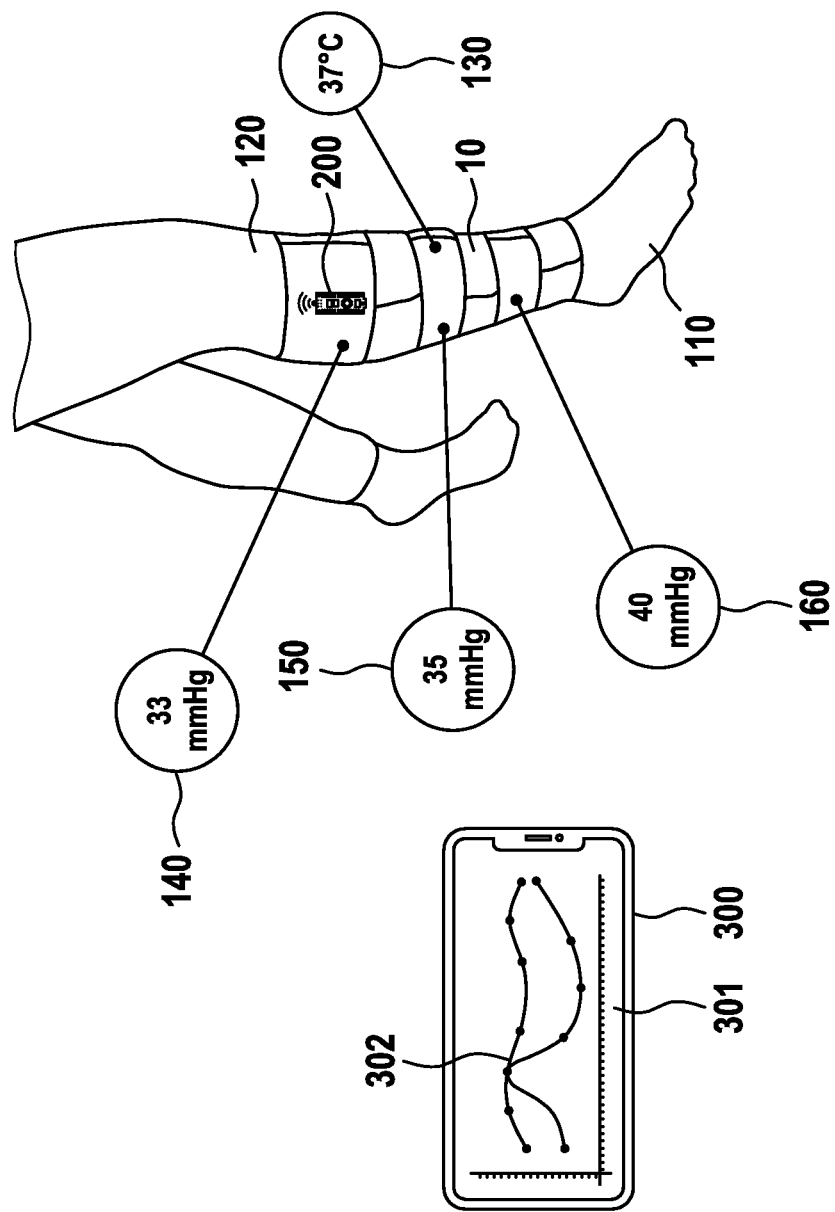
FIG. 9 shows the arrangement according to FIG. 7 in actual use.

According to FIG. 9 the capacitive pressure sensors 240, 250 and 260 of the arrangement shown in FIG. 7 are attached to a compression bandage 100 such that a first pressure sensor 240 is arranged at a proximal end portion of the bandage 100, a second pressure sensor 250 is arranged at a central portion of bandage 100 and a pressures sensor 260 is arranged at a distal end portion of the bandage 100. Further, temperature sensor which is not shown in FIG. 7 is provided. Sensor signals from each of said sensors 210, 240, 250 and 260 are transmitted via transmitter means 101 to the external device 300 which has installed thereon an app 301 which is capable to generating an indicator 302 providing a graphic representation of pressure data 140, 150, 160 and temperature data 130, and optionally external data as one or more graphs 302 illustrating development of pressure 140, 150, 160 and/or temperature 130 level.

Figure 10:
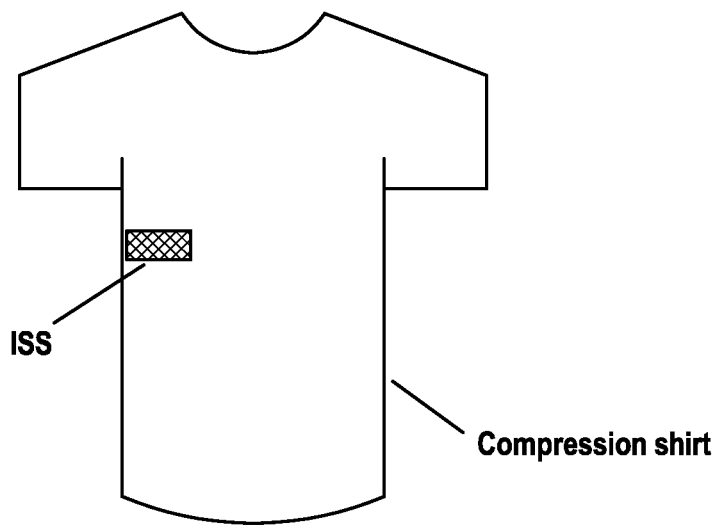
FIG. 10 shows the ISS according to FIG. 5 in actual use of a compression shirt.
Figure 10:
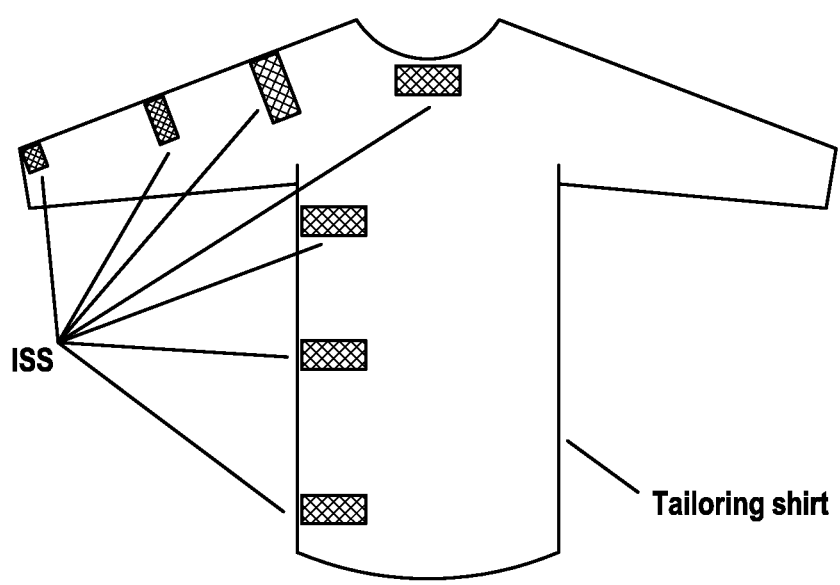

FIG. 10a) shows a possible application of the ISS in a compression shirt, where the compression of the textile can be measured in a defined position. This way, it can be concluded from the measurements, if the t-shirt provides the right compression at the right position. Extending the number of sensors FIG. 10b), this further allows to adapt the cut according to the user, which enables individually cut textiles without the need of circumference measurements, which are often error prone due to the lack of a general definition of the measurement position. This is an enabler to custom cut online platforms providing custom cut textiles to the user.

Figure 11:
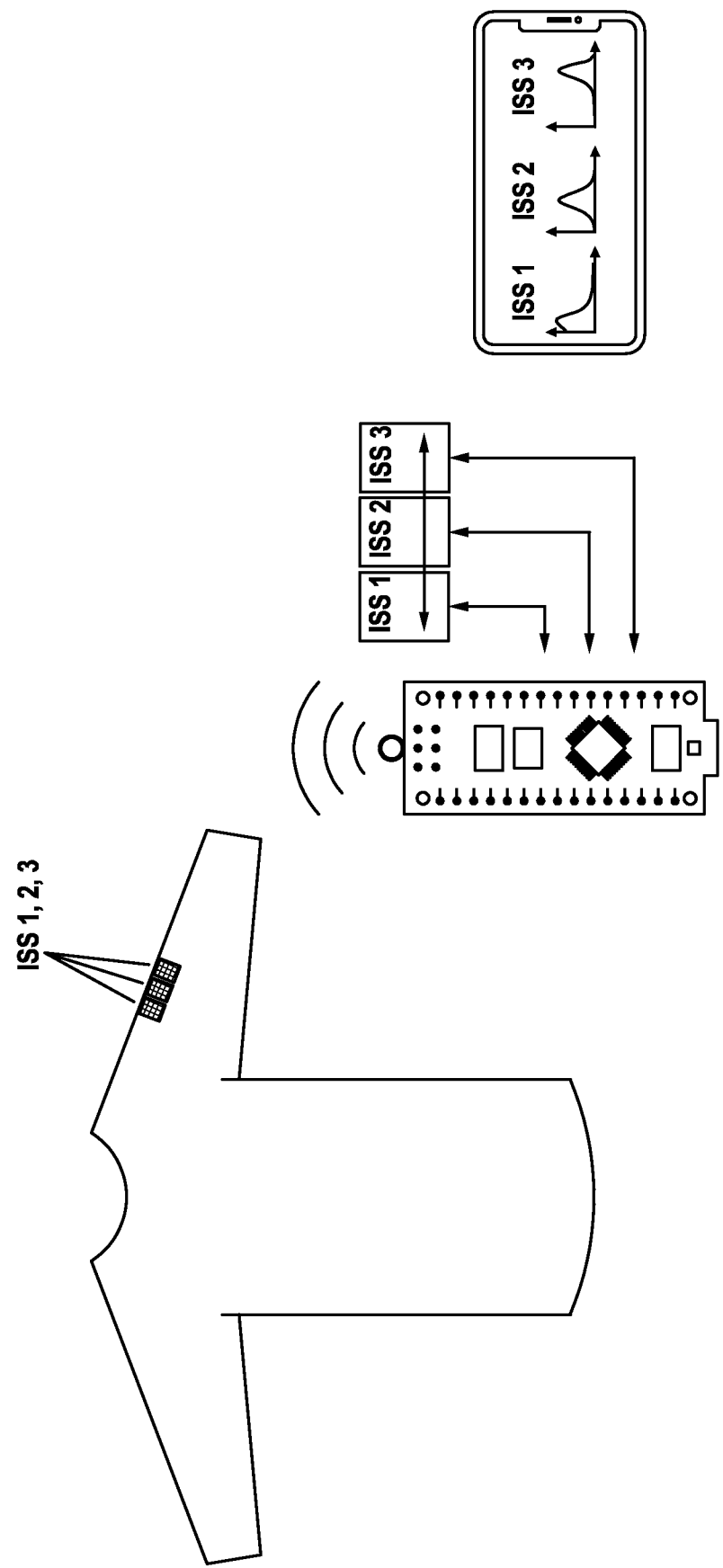
FIG. 11 shows the ISS according to FIG. 6 in actual use of a swipe sensor

FIG. 11 shows a possible application scenario of multiple ISS mounted on a sleeve such that a pressure sensitive swipe interface can be realized. The ISS might be used in this case as a user interface to the shirt electronics which could control other connected devices such as smartphones.

Figure 12:
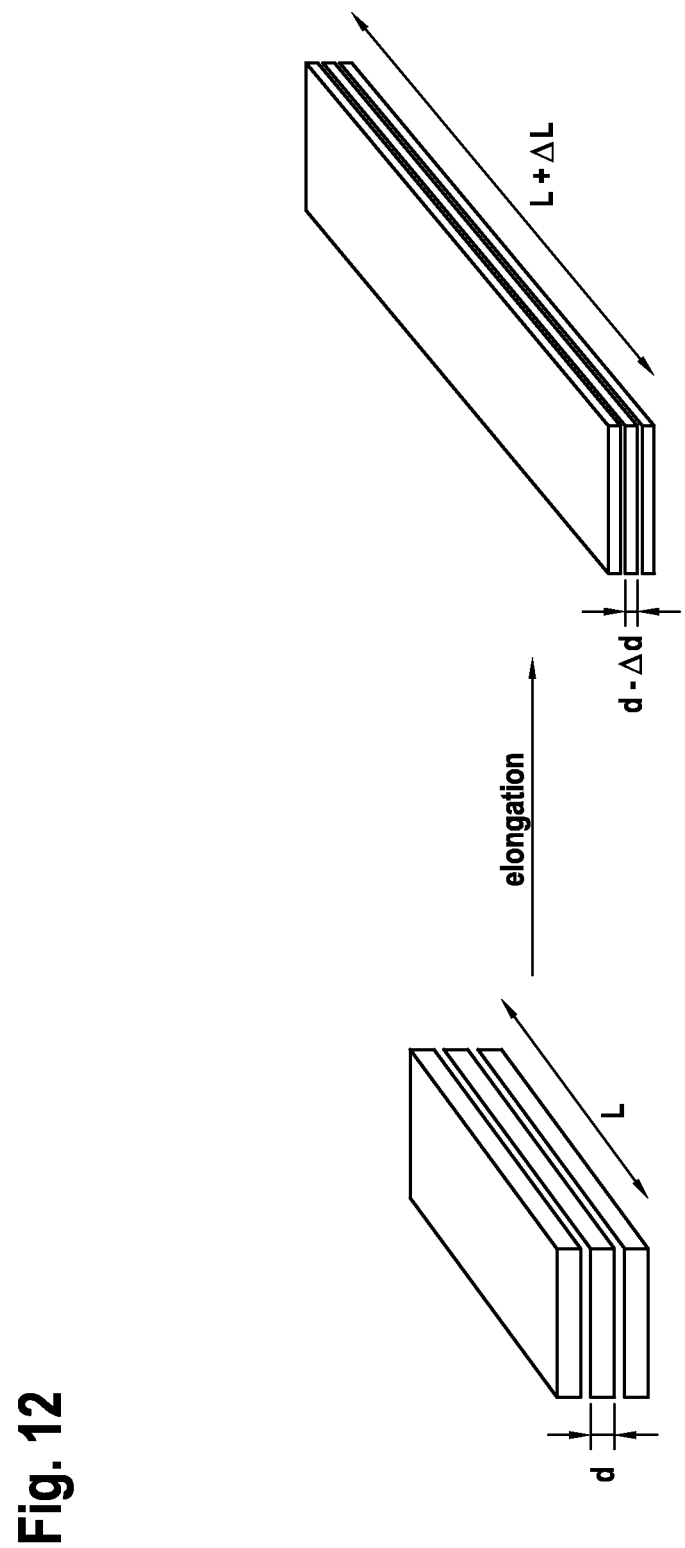
FIG. 12 shows the working principle of the stretch sensor of the ISS

The strain sensor impedance of the ISS comprises two conductive surfaces (electrodes), which are oriented in parallel being separated by incompressible dielectric layer. This dielectric may be formed of an incompressible material (as for example silicone). The working principle is shown in FIG. 12. If the sensing system of such construction is stretched (L+ΔL) the dielectric layer preserves its volume and extends in the x or y direction while getting thinner in the z-direction. The distance among the two conductive surfaces is reduced (d−Δd) and the capacity of the structure is getting bigger. As the dielectric is incompressible, the distance among the two electrodes is not or barely changed by the application of pressure on the sensor. This way, the stretch sensor provides the ideal reference sensor for the compression sensor. And furthermore, as the compression sensor is not or barely changing its impedance by elongation, the pressure impedance is an ideal reference sensor for the elongation sensor.

The conformable stretch sensor has a multitude of applications in the field of textile sensors.

1. The stretch sensor may be affixed to a sports shirt (FIG. 10) such that the breathing rate can be measured through the elongation of the sensor due to the inflation of the lungs. Implementing a plurality of those sensors in such a shirt, the breathing volume may be estimated without measuring the airflow directly. A wearable sensor system capable of simultaneously measuring respiration rate and estimating the breathing volume may be realized in the form a sensor garment.
2. The stretch sensor may be attached around a muscle in order to measure muscular activity. This application may be used to analyze musculoskeletal health of a person.
3. The stretch sensor may be applied on a person's joints to measure the joint angles FIG. 13. This application may be especially useful in rehabilitation, such as for measuring joint angles in a home environment for creating a record of the effectiveness of exercises performed.

4. A possible application is a sensor shirt (FIG. 10) that measures the circumference of the upper body limbs, as well as the torso, such that custom cut textiles may be fabricated. In this uses case the client will not need to go to an alteration tailor to do a perfect adaption of the shirt, this method will as well apply to sports trousers.

Figure 14:
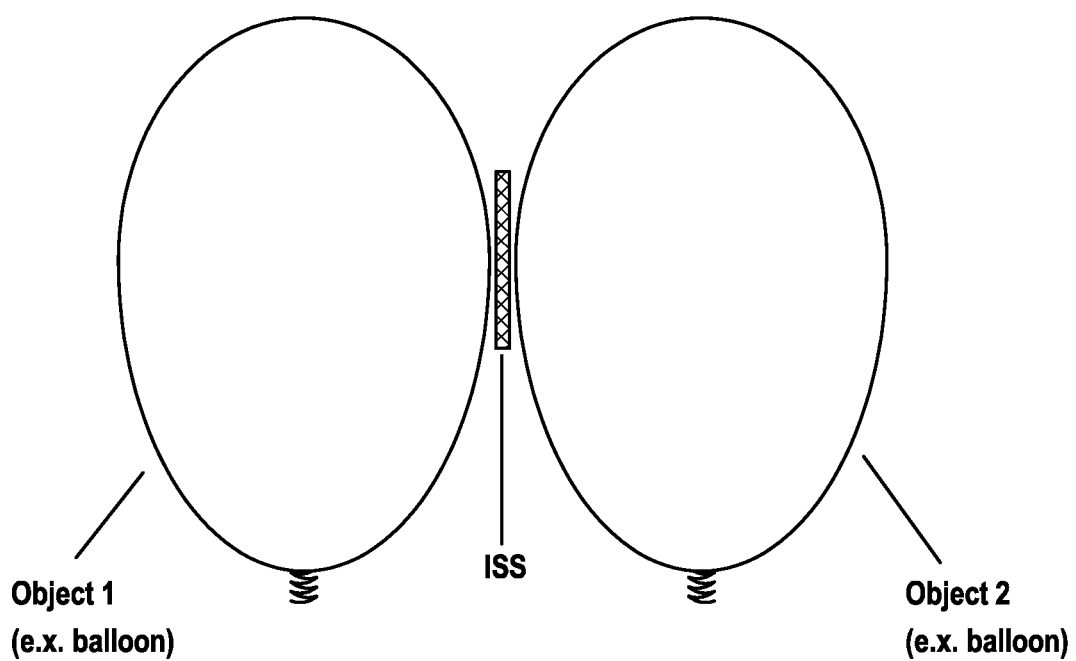
FIG. 14 shows how the sensor can be applied among two balloons

FIG. 14 shows how the sensor can be applied between two balloons to measure the pressure among them. As this requires a conformable sensor, the ISS is predestined to this usage scenario.

Figure 15:
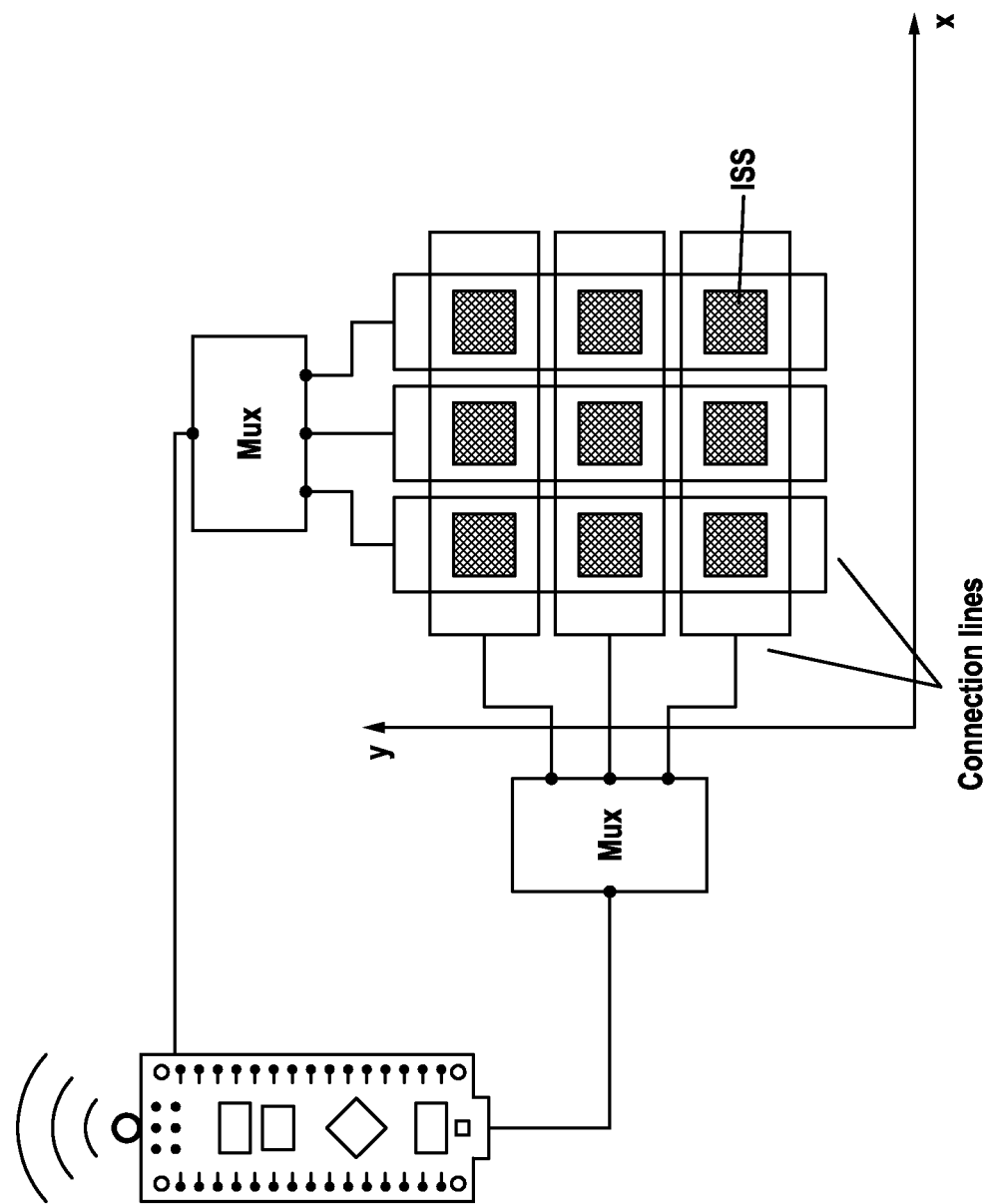
FIG. 15 shows how the sensor can be extended to a matrix array of sensors FIGS. 16a)-c) Shows the ISS in a closed structure, an open structure and with a membrane for gas exchange

FIG. 15 shows a matrix scenario of the ISS. In the figure, the matrix consists of three by three ISS sensors, which are sampled one by one in a consecutive manner. This way, a x-y-resolution of the ISS can be achieved by just consuming two sensor inputs, which are switched through the three sensors in x and y. This enables the use of a large amount of ISS by just a small amount of sensor inputs and it further simplifies the wiring of the sensor grid, as the matrix structure only needs to be connected from the outside.

Figure 16:
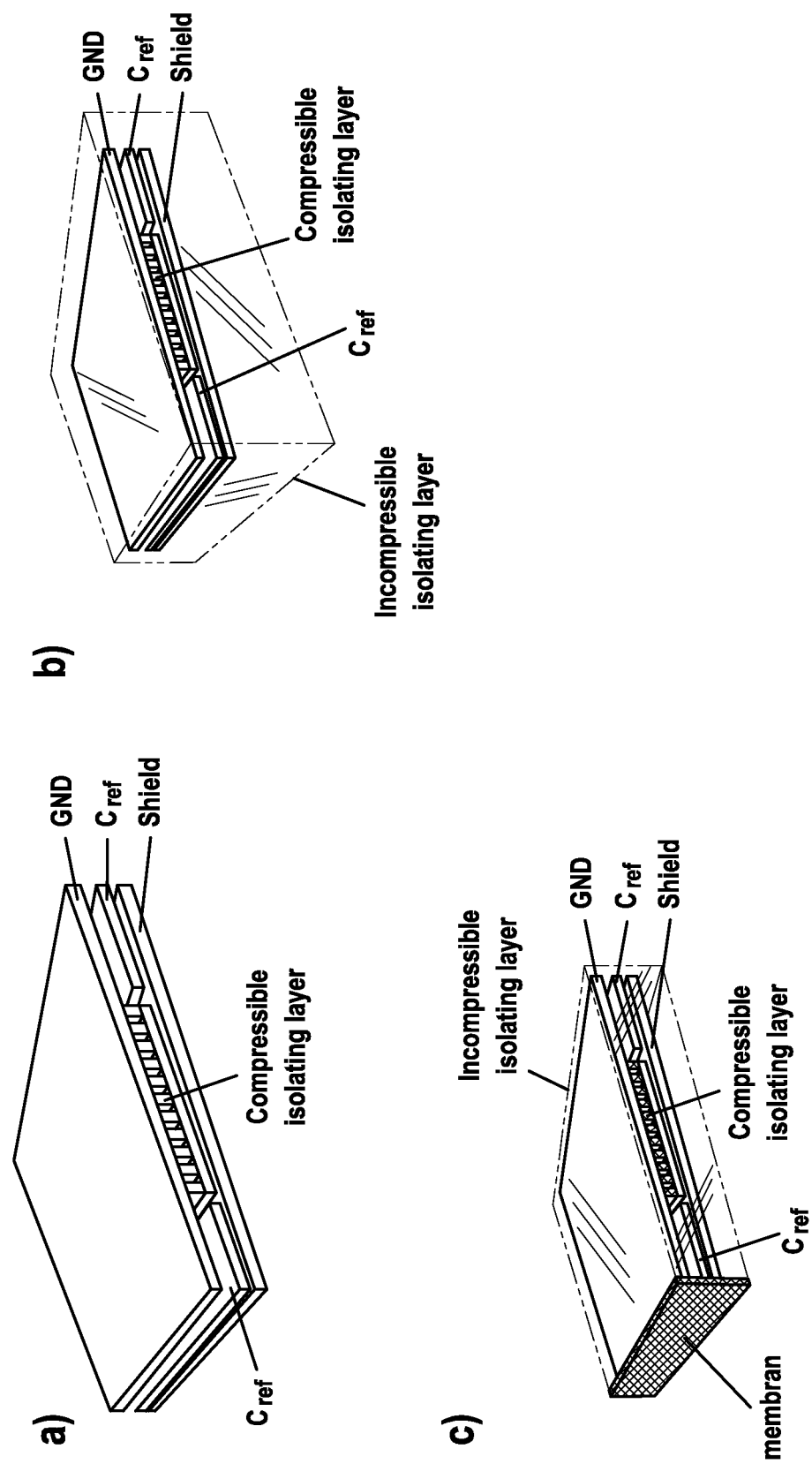

FIG. 16 show an open, a closed and a structure with a membrane. The open structure would be vulnerable to water as its high epsilon r will highly raise the sensor capacity. The closed structure will be influenced by atmospheric pressure changes and finally the structure with a membrane will prevent having some water entering the structure, while a gas exchange to the exterior is possible.

Figure 17:
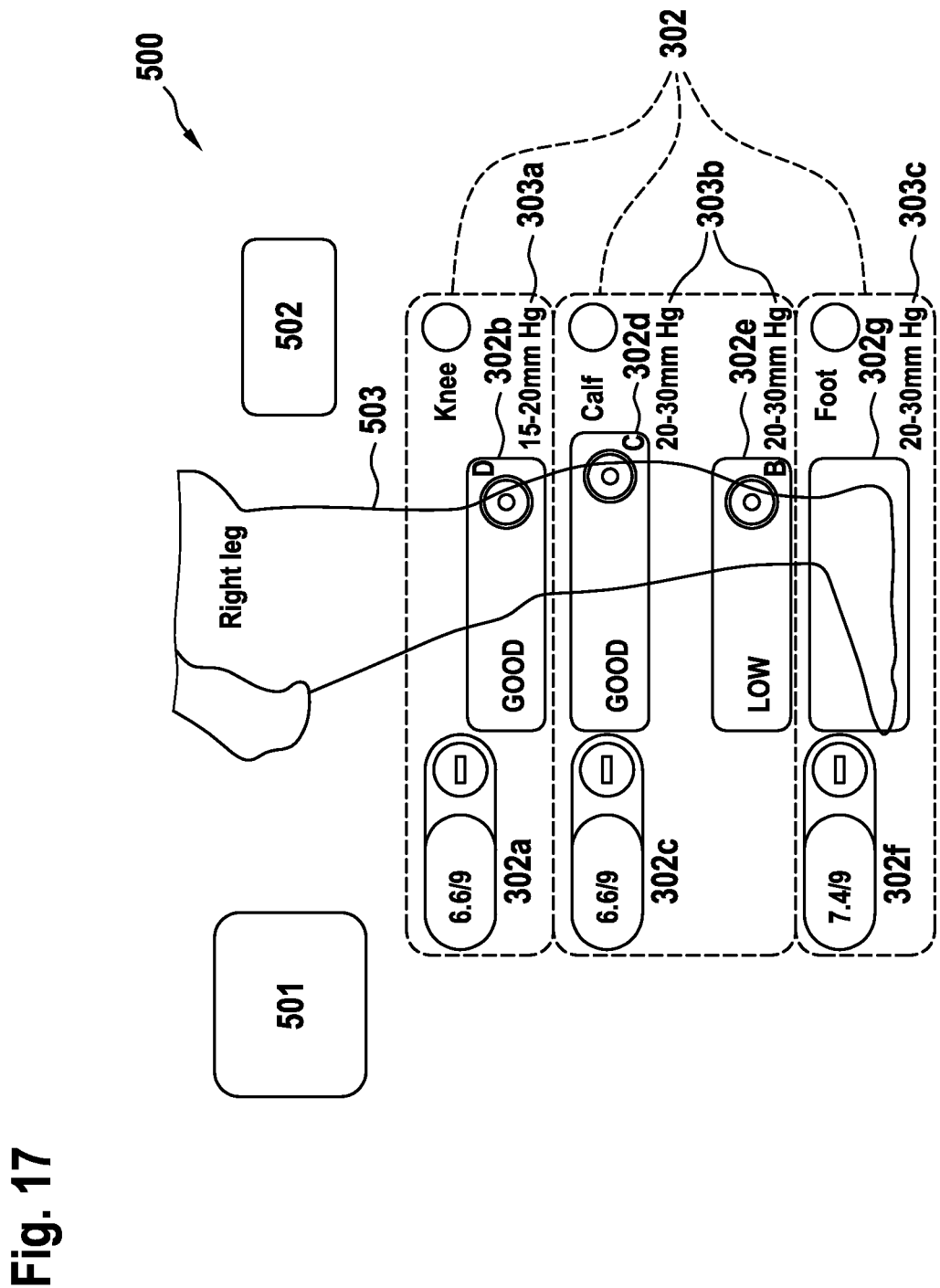
FIGS. 17, 18 and 21 show illustrating graphical outputs by the external device, being in communication with the compression therapy arrangement, for monitoring the operation of the compression therapy arrangement, such as the compression therapy arrangement according to FIG. 6 or FIG. 7.
Figure 18:
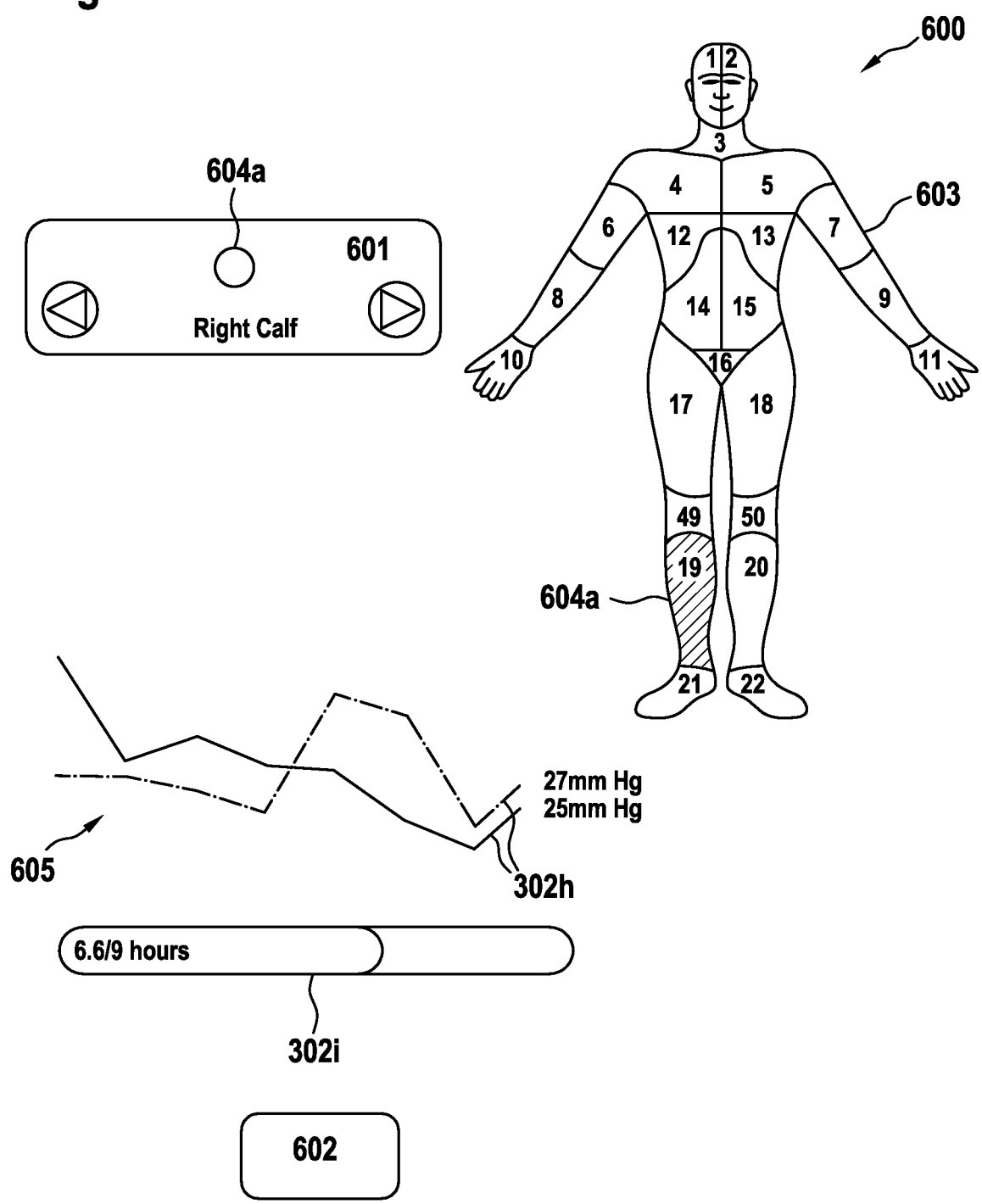
Figure 21A:
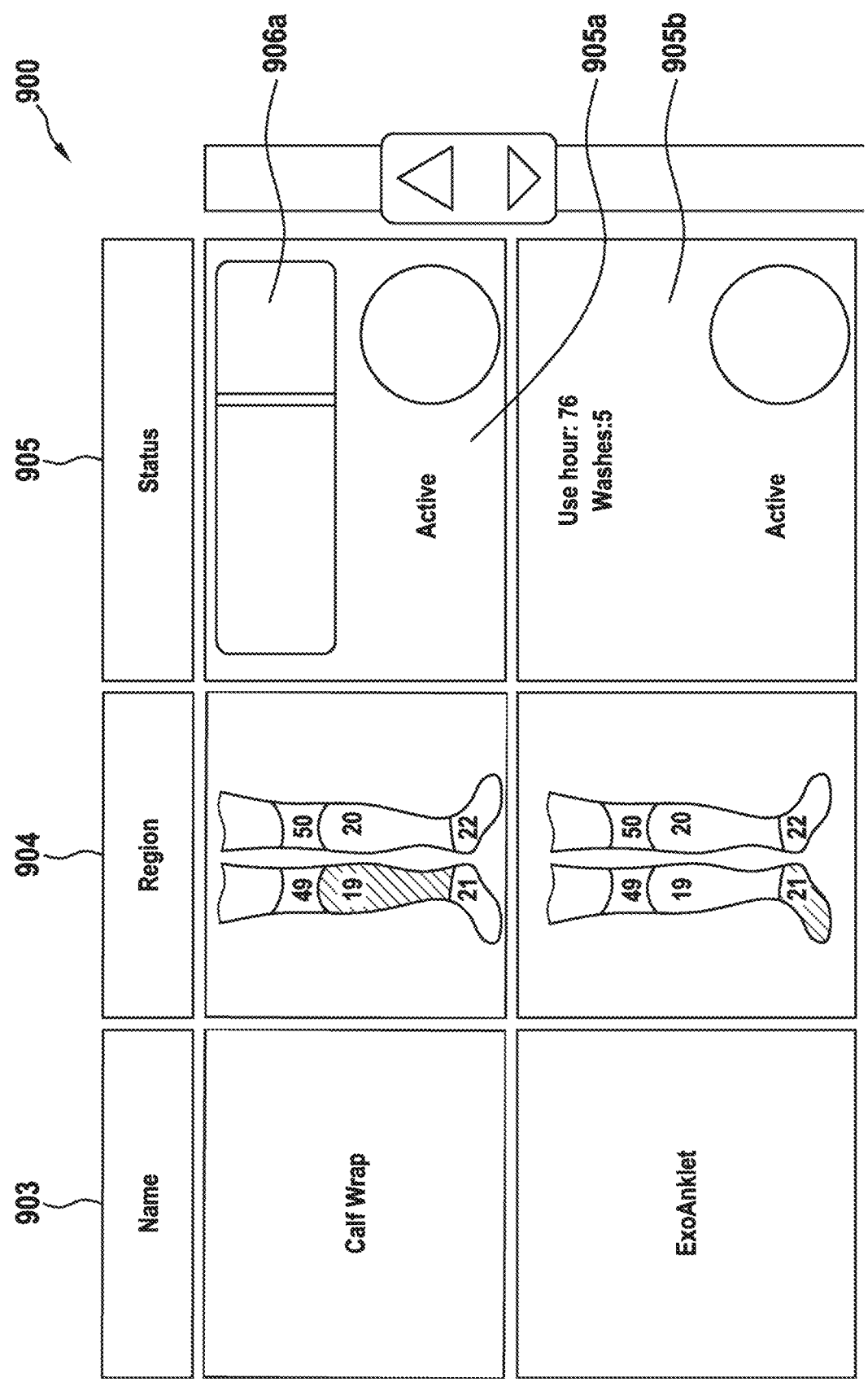
Figure 21B:
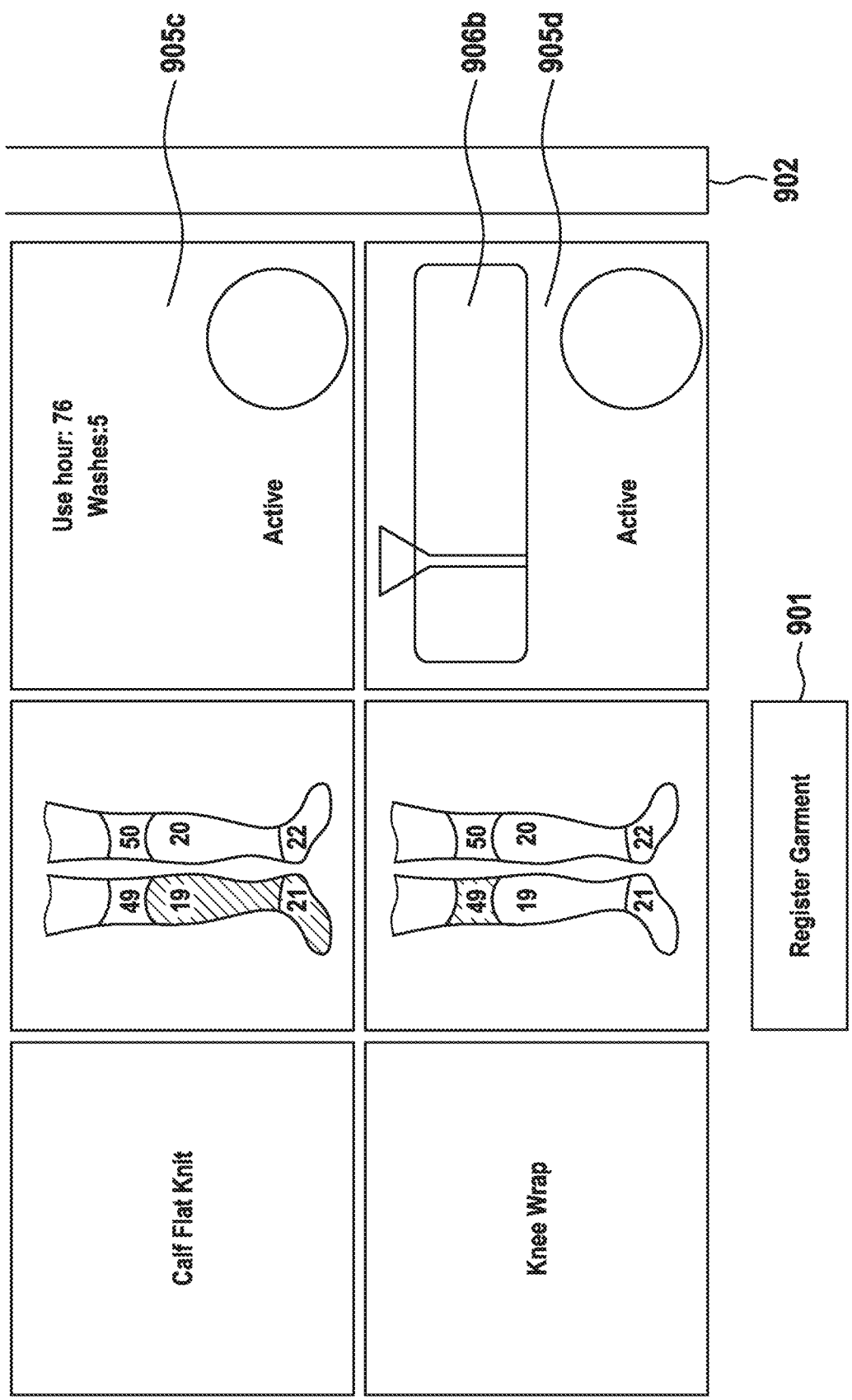

FIGS. 17, 18 and 21 show illustrating graphical outputs by the external device being in communication with the compression therapy arrangement for monitoring the operation of the compression therapy arrangement, such as the compression therapy arrangement according to FIGS. 6 and 7. FIGS. 17, 18 and 21 also show optional means for user input via the external device, the user input to be used for monitoring of the operation of the compression therapy arrangement.

In particular, FIGS. 17, 18 and 21 show graphical outputs 500, 600, 900 via a graphical user interface of the external device 300, wherein the graphical output 500, 600, 900 may be generated by the application 301 and may be displayed by the display of the external device 300.

FIGS. 17 and 21 illustrate exemplary indicators 302, 302a, 302b, 302c, 302d, 302e, 302f, 302g, 302h, 302i, 905a, 905b, 905c, 905d, 906a, 906b indicating operational states of the compression garment 100. The operational states referred to in this disclosure may dynamically change and may be determined automatically. The corresponding indicators 302, 302a, 302b, 302c, 302d, 302e, 302f, 302g, 302h, 302i, 905a, 905b, 905c, 905d, 906a, 906b may be presented and updated in real-time or in substantially real-time. Alternatively, these indicators may not be presented and updated in real-time or in substantially real-time, but rather are presented and updated at particular times during the course of the running application 301, such as when the application 301 is started and/or at periodic intervals between connecting of the application 301 with the compression therapy arrangement and disconnecting of the application 301 with the compression therapy arrangement.

At least one computer hardware processor located in the external device 300 is configured to perform the following operations: obtaining an identifier of a compression therapy arrangement, the compression therapy arrangement including a compression garment 10; determining an operational state of a portion of the compression garment 10 based on the obtained identifier; and generating instructions for displaying of an indicator 302, 302a, 302b, 302c, 302d, 302e, 302f, 302g, 302h, 302i, 905a, 905b, 905c, 905d, 906a, 906b of the determined operational state. The display of the external device 300 may display the indicator 302, 302a, 302b, 302c, 302d, 302e, 302f, 302g, 302h, 302i, 905a, 905b, 905c, 905d, 906a, 906b of the determined operational state. The operational state is determined by using the therapy signals 108 transmitted by the transmitter means 101 and received by the external device 300.

The external device 300 may be configured to scan a code, wherein the code encodes the identifier of the compression therapy arrangement and wherein the identifier is obtained through the scanning of the code. The code may be a QR code or a bar code.

Based on the obtained identifier, the external device 300 can obtain, from a local or remote data store, such as remote database 1001 described in context of FIG. 15, at least one range of allowable and/or targeted values 303a, 303b, 303c for at least one operational parameter of the portion of the compression garment 10, wherein the indicator 302, 302a, 302b, 302c, 302d, 302e, 302f, 302g, 302h, 302i, 905a, 905b, 905c, 905d, 906a, 906b may indicate the obtained at least one range of allowable and/or targeted values 303a, 303b, 303c. In other words, based on the obtained identifier of the compression garment 10, the external device 300, in particular the application 301, can obtain identification of which type of compression garment is to be used (paired) with the external device 300 and the application 301 can implement the boundaries of proper operation of the particular garment 10 being used (paired) with the external device 300 in the application 301, to prevent unapproved operation of the garment 100 by the user (patient).

The determining of the operational state may include obtaining, by the external device 300 and from the sensor device 200 via the transmitter means 101, one or more measured values 302h for the at least one operational parameter of the portion of the compression garment 100.

The determining of the operational state may include comparing the one or more measured values 302h with the at least one range of allowable and/or targeted values 303a, 303b, 303c, wherein the indicator 302, 302a, 302b, 302c, 302d, 302e, 302f, 302g, 302h, 302i, 905a, 905b, 905c, 905d, 906a, 906b may indicate a result of the comparing of the one or more measured values 302h with the at least one range of allowable and/or targeted values 303a, 303b, 303c.

The indicator 302, 302a, 302b, 302c, 302d, 302e, 302f, 302g, 302h, 302i, 905a, 905b, 905c, 905d, 906a, 906b may indicate how the measured values 302h relate to the range of allowable and/or targeted values 303a, 303b, 303c.

The portion of the compression garment 10 may include a plurality of subparts, such as subparts "B", "C" and "D", of the compression garment 10, the at least one range of allowable and/or targeted values 303a, 303b, 303c includes a plurality of ranges of allowable and/or targeted values 303a, 303b, 303c for the at least one operational parameter with each range of the plurality of ranges 303a, 303b, 303c being associated with a corresponding subpart of the plurality of subparts, and wherein the indicator 302, 302a, 302b, 302c, 302d, 302e, 302f, 302g, 302h, 302i, 905a, 905b, 905c, 905d, 906a, 906b indicates, for each subpart of at least some of the plurality of subparts of the compression garment 100, how respective ones of the measured values measured for the respective subpart relate to an associated one of the ranges of allowable and/or targeted values 303a, 303b, 303c corresponding to the subpart of the plurality of subparts.

As illustrated in an exemplary manner in FIG. 17, indicator 302b indicates that the pressure exerted by subpart D of the compression garment 10 being applied to the knee of the right leg of the patient is within the range of allowable pressure values 303a associated with this subpart D of the compression garment at the knee. Indicator 302d indicates that the pressure exerted by subpart C of the compression garment 100 being applied to the calf of the right leg of the patient is within the range of allowable pressure values 303b associated with this subpart C of the compression garment at the calf. Indicator 302e indicates that the pressure exerted by another subpart B of the compression garment 10 being applied to the calf of the right leg of the patient is below the range of allowable pressure values 303b associated with this subpart B of the compression garment at the calf.

As also illustrated in an exemplary manner in FIG. 17, indicator 302a indicates that the operating time or wearing time of the subpart D of the compression garment 100 being applied to the knee of the right leg of the patient is within the range of targeted values associated with this subpart D of the compression garment at the knee and is 6.6 hours out of targeted 9 hours. Indicator 302c indicates that the operating time or wearing time of the subpart C of the compression garment 100 being applied to the calf of the right leg of the patient is within the range of targeted values associated with this subpart C of the compression garment at the calf and is here also 6.6 hours out of targeted 9 hours. Indicator 302f indicates that the operating time or wearing time of a subpart of the compression garment 100 being applied to the foot of the right leg of the patient is within the range of targeted values associated with this subpart of the compression garment at the foot and is here 7.4 hours out of targeted 9 hours.

As illustrated by indicator 302g, the operational state may include an operational state of a particular subpart (subpart "A" at the foot, not shown) of the plurality of subparts, wherein the indicator 302, 302g indicates that the particular subpart is not yet activated for read-out of the at least one operational parameter. The reason may be that the particular subpart of the compression garment 10 does not yet have a sensor for measuring values of the at least one operational parameter, such as a pressure sensor 240, 250, 260 for measuring values of exerted pressure, or that the sensor is present at the particular subpart of the compression garment 100 but the sensor is not activated for read-out of values of the at least one operational parameter. In other words, indicator 302g pertains to an operational state of inactivity (hence subpart "A" at the foot is not shown) of the monitoring of the subpart of the compression garment 100 being applied to the foot of the right leg of the patient. The operations performed by the hardware processor of the external device may further comprise: receiving an activation signal for activating read-out of the at least one operational parameter for the particular subpart (e.g., subpart "A" at the foot); and in response to the receiving of the activation signal, changing the indicator 302g of the operational state of the particular subpart such that the changed indicator 302g indicates that the particular subpart is activated for read-out of the at least one operational parameter.

Each of the ranges of allowable and/or targeted values may form a part of the corresponding indicator 302, 302a, 302b, 302c, 302d, 302e, 302f, 302g or may be separate therefrom.

The indicator 302, 302a, 302b, 302c, 302d, 302e, 302f, 302g, 302h, 302i, 905a, 905b, 905c, 905d, 906a, 906b may include a graphical illustration 503, 603, 703, 803 of a portion of a human body, wherein the graphical illustration is also graphically outputted via the graphical user interface of the external device 300. The indicator 302, 302a, 302b, 302c, 302d, 302e, 302f, 302g, 302h, 302i, 905a, 905b, 905c, 905d, 906a, 906b may indicate how the measured values 302h relate to the range of allowable and/or targeted values 303a, 303b, 303c at a location of the graphical user interface that is associated with a subpart of the graphical illustration corresponding to a body portion (e.g. body part) at which the corresponding portion of the compression garment 100 is applied to the patient.

For example, as illustrated in FIG. 17, each of the indicators 302a-302g are graphically outputted/displayed via the graphical user interface of the external device 300 and in reference to or in association with the subpart of the graphical illustration 503, 603, 703, 803 corresponding to the body portion at which the subpart (here: A, B, C, D) of the compression garment 10 is applied to the patient. For example, indicator 302b relates to a knee, as explained above, and is graphically outputted/displayed above a graphical illustration of the knee of the right leg of the patient. However, indicator 302b may also be graphically outputted/displayed in a manner not overlapping (e.g. disjoint) with the graphical illustration of the knee, but still at a location of the graphical user interface that is associated with the graphical illustration of the knee of the right leg of the patient at which the corresponding subpart D of the compression garment 10 is applied to the patient. For example, indicator 302b may be graphically outputted/displayed in a manner not overlapping (e.g. disjoint) with the graphical illustration of the knee, but with a displayed graphical link between the indicator 302b and the graphical illustration of the knee.

FIG. 17 also shows optional means 501, 502 at the graphical user interface of the external device 300 for user input to be used for the monitoring of the operation of the compression therapy arrangement. For example, the graphical user interface may display an element 501 configured to receive user input, such as user input causing activation of a (daily) log of the operational states. The graphical user interface may also display an element 502 being configured to receive another user input, such as user input causing an adding of an additional compression therapy arrangement to be monitored.

The hardware processor of the external device 300 may further perform the operations comprising: receiving, for a subpart of the plurality of subparts or the portion of compression garment 100 and via the graphical user interface of the external device 300, user input pertaining to a change of a setting corresponding to the at least one operational parameter; and in response to the receiving of the change of the setting, generating instructions for display, via the graphical user interface, of a feedback message indicating whether or not the received change of the setting is in accordance with the at least one range of allowable and/or targeted values 303a, 303b, 303c that is associated with the subpart of the portion of the compression garment 100.

As illustrated in an exemplary manner in FIG. 17, embodiments of the present invention assist the user in properly operating the underlying technical system, namely the compression therapy arrangement.

FIG. 18 illustrates graphical output 600 pertaining to a real-time or substantially real-time monitoring of measured values of an operational parameter of the compression therapy arrangement.

At least one computer hardware processor located in the external device 300 is configured to perform the following operations: displaying one or more compression therapy set-up procedure screens 601, 602 (see also 501, 502, 700, 800) that require user input; and displaying one or more compression therapy treatment screens 605 (see also 302, 905) that graphically illustrate in at least substantially real-time measured values 302h of at least one operational parameter associated with a compression therapy arrangement, the compression therapy arrangement including a compression garment 10 being used for a compression therapy. The measured values 302h of at least one operational parameter are obtained from the therapy signals 108 transmitted by the transmitter means 100 and received by the external device 300.

The operational parameter being monitored in real-time or in substantially real-time may be an operational parameter of the compression garment 100, such as an exerted pressure measured by one of pressure sensors 240, 250, 260. As also illustrated by the solid and dashed graphs in indicator 302h, values measured at multiple sensors pertaining to the same or multiple different operational parameters may be displayed via the graphical user interface in a compression therapy treatment screens 605. In FIG. 11, the multiple graphs 302h pertain to multiple different pressure sensors, such as the pressure sensors associated with subparts B and C in FIG. 10. The graphical output 600 or the one or more compression therapy treatment screens 302, 605, 905 may preferably graphically illustrate the measured values of the at least one operational parameter in association with a particular body portion 120, 604a, 704 to which the compression garment 10 is attached. That is, the relevant body portion 604a where the one or more operational parameters are being monitored in real-time or in substantially real-time is preferably indicated.

As illustrated in FIG. 18, the graphical output 600 or the compression therapy treatment screen 605 may also include another indicator 302i, in which the current operating time or wearing time in relation to a corresponding allowable value or target value is displayed, wherein in case of FIG. 6. 6 hours current operating time or wearing time out of 9 max. targeted hours are shown.

The one or more compression therapy treatment screens 302, 605, 905 may thus graphically illustrate the progress of at least one step in the compression therapy in at least substantially real-time.

The one or more compression therapy treatment screens 302, 605, 905 may graphically illustrate (see, e.g., indicator 302i) the measured values of the operational parameter in relation to a range of allowable and/or targeted values 303a, 303b, 303c for the operational parameter.

Figure 13:
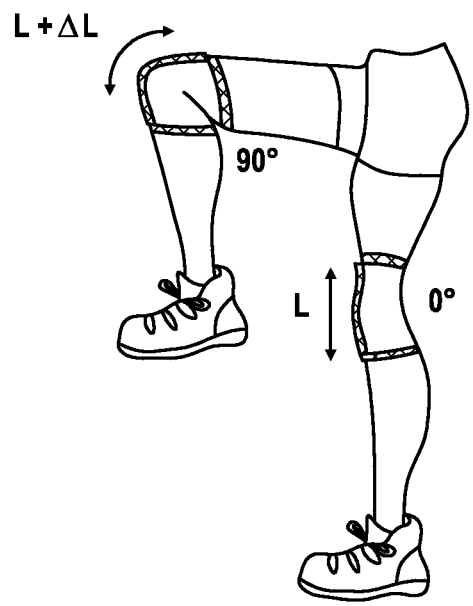
FIG. 13 shows the ISS stretch sensor used to measure a joint angle
Figure 13:
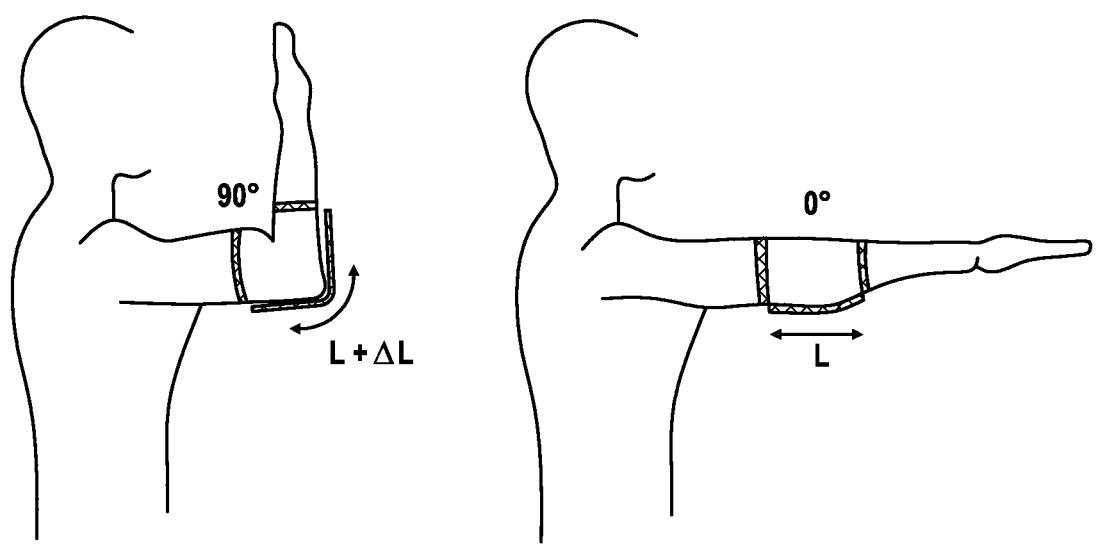

As shown in FIG. 18, the one more compression therapy set-up procedure screens 501, 502, 601, 602, 700, 800 may require user input pertaining to a body portion 12, 604a, 704 to which the compression garment 100 is attached. For example, the user of the external device 300 may switch between different body portions where subparts of the compression garment 100 are attached to obtain the corresponding real-time or substantially real-time measured values of the one or more operational parameters. In particular, the user may switch selection between the different body portions via the compression therapy set-up procedure screens 601 to obtain the respective current pressure values of the subpart of the compression garment attached to the selected body portion. The one or more compression therapy set-up procedure screens 501, 502, 601, 602, 700, 800 may also require user input pertaining to one or more dimensions of one or more body portions 120, 604a, 704 of a patient, a start and/or end time of a wearing time of the compression garment 100 by a patient, wash cycles applied to the compression garment 100 and/or a value of an external pressure exerted by the compression garment 10 onto a body portion 120, 604a, 704 of a patient, as also illustrated in FIGS. 12 and 13. Through such user input, the application 301 can also be used to track compression garment usage, such as the operating time or the wearing time as illustrated in an exemplary manner by indicators 302a, 302c and 302f in FIG. 10 or indicators 905b, 905c in FIG. 14, for compression therapy arrangements having no sensor device 200 that is in communication with the external device 300.

FIG. 18 also shows that graphical output 600, in particular screen 601, may include other graphical elements as needed, such as an element by which the user can also submit other user input, such as submit to stop the monitoring.

As illustrated in an exemplary manner in FIG. 18, embodiments of the present invention allow tracking values of one or more operational parameters of the compression therapy arrangement in real-time or substantially real-time, which provides the user with continued feedback about the operation of the underlying technical system, namely the compression therapy arrangement.

Figure 19:
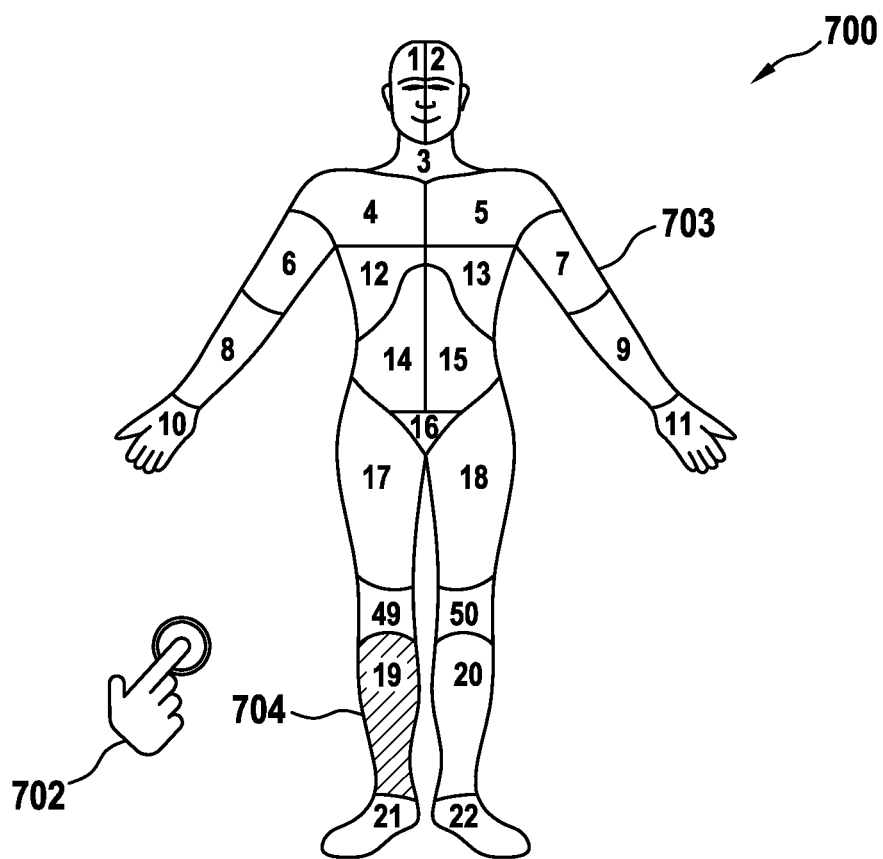
FIGS. 19 and 20 show further optional means at the graphical user interface of the external device for user input to be used for the monitoring of the operation of the compression therapy arrangement as shown by FIGS. 8, 9, 10, 11 and 14.
Figure 20:
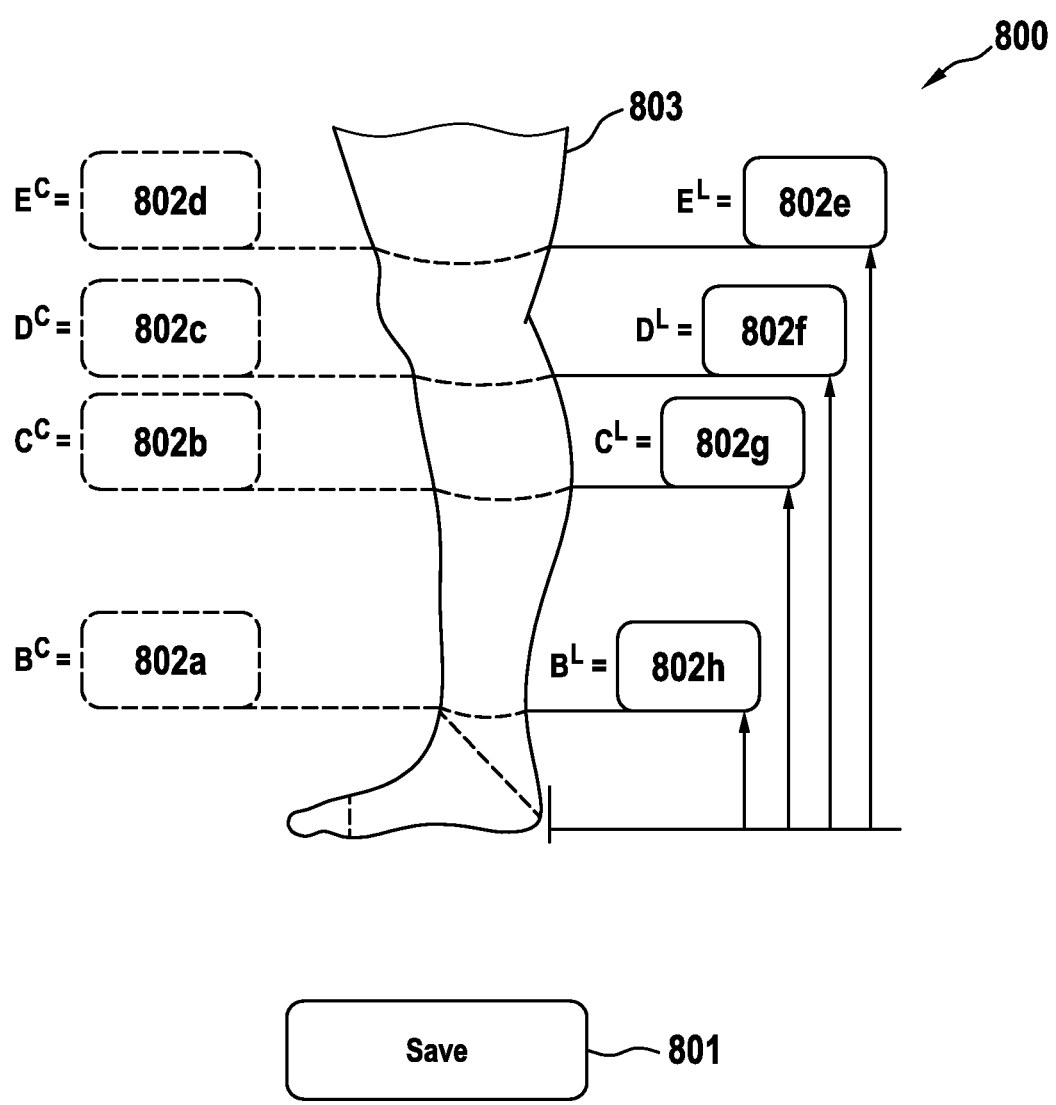

FIGS. 19 and 20 also show optional means at the external device for user input to be used for the monitoring of the operation of the compression therapy arrangement as shown by FIGS. 17, 18 and 21.

As illustrated by FIG. 19, the graphical user interface of the external device 300 may display a graphical illustration 703 of a human body. The graphical illustration 703 indicates individual ones of a plurality of body portions, which are selectable by the user, such as the patient. Upon selection by the user, the selected body portion 704 is displayed in a manner that highlights the selected body portion 704 to distinguish the selected body portion 704 from the other non-selected body portions. In this disclosure, a body portion may include a body part of the human body, may be a subpart of a body part of the human body or may be a body part of the human body.

As also illustrated by FIG. 19, the graphical user interface of the external device 300 may display an element 701, such as an icon, which the user can activate to enter measurements of body portions, such as selected body portion 704. The user may use one or more of his fingers 702 or another position indicator, such as a stylus, to perform this activation of the element 701 before or after selecting the body portion 704 for which the measurement is to be entered. A graphical output 800 with a graphical illustration 803 of a portion of the human body, as illustrated in FIG. 13, may be triggered in response to activating element 701 in which the user may enter, into graphically depicted fields 802a-802h of the graphical user interface of the external device 300, individual values for sizes of individual subparts of the selected body portion 704 in FIG. 12. The graphical output 800 may also include a graphical element 801 to save the entered sizes. The size may pertain to height, width, length and/or circumference of the respective body portion.

As discussed above in relation to FIGS. 17 and 18, the at least one operational state or operational parameter being monitored may, for example, include an external pressure exerted by the compression garment 100 on a body portion 120, 604a, 704 of a patient, availability of a sensor being activated for read-out out, and/or an operating time or wearing time of the portion of the compression garment 100. As illustrated in FIG. 21, the at least one operational state or operational parameter being monitored may additionally or alternatively include a number of washing cycles (washes) the compression garment 100 has experienced.

FIG. 21 illustrates, in an exemplary tabular form, the user specified identifier or names 903 of the compression garment, graphical illustrations of the regions 904 of the corresponding subparts of the compression garment 10 along the human body, and the corresponding operational state or status 905 of the corresponding subpart of the compression garment 100. The operational state or status 905 may include a remaining usable garment life 906a, 906b, whether or not a sensor is activated for read-out 905a, and operating times/wearing times as well as experienced washing cycles (washes) in indicators 905b-905d. The user may be enabled by the graphical user interface to scroll or switch between the different compression garments via graphical element 902. The graphical output 900 may further include other optional graphical elements, such as graphical element 901 to register an additional compression garment, which may involve scanning the code encoding the identifier of the additional compression garment.

A remaining usable garment life may be determined by the external device 300, and displayed graphically via its graphical user interface or display, such as by indicators 906a, 906b in FIG. 21, based on user input data and/or collected usage data. The collected usage data may include the operating time or wearing time of the compression garment 10 and the number of washing cycles the compression garment 100 has experienced, as shown in indicators 905b and 905c. That is, the remaining usable garment life may be determined or calculated as a function depending on the operating time or wearing time as well as on the number of washing cycles (washes). For example, indicator 906a may indicate that the corresponding subpart of the compression garment 100 has reached 70% of its possible garment life, leaving 30% of the garment life still available for usage. For example, indicator 906b may indicate that the corresponding subpart of the compression garment 100 has reached 20% of its possible garment life, leaving still 80% of the garment life available for usage.

The operations performed by the hardware processor of the external device may further comprise: generating instructions for display of guiding information, the guiding information including instructions for a user how to properly operate the compression garment 100.

Figure 22:
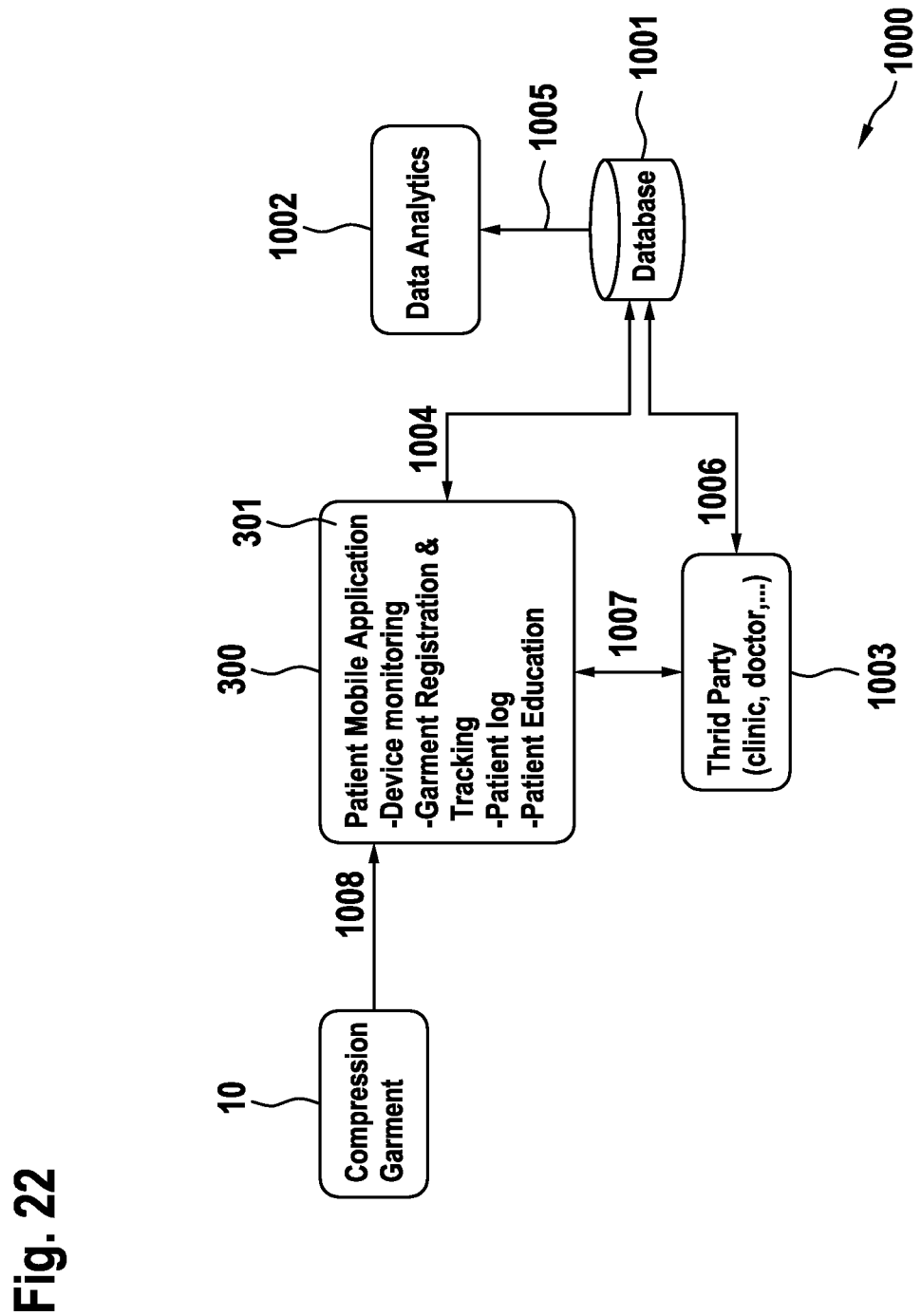
FIG. 22 illustrates a remote database according to an embodiment of the invention.

FIG. 22 illustrates a networked environment 1000 and which the compression therapy arrangement including the garment 100 is communicating with the external device 300 via a communication link 1008, such as via Bluetooth or NFC, to transmit the therapy signals 108. Also, the external device 300 is communicating with a database 1001 via a communication link 1004, such as via a network connection (e.g., LAN, WAN, or Internet), and with a third party component 1003 via the communication link 1007, such as via a network connection (e.g., LAN, WAN, or Internet). The third party component 1003 may be a software component, a hardware component or a combination of both. In particular, the third party component 1003 may be a (web) server, web interface and/or another mobile application. The third party component 1003 is operated by the third party, such as clinic personnel or a physician.

For example, the above at least one range of allowable and/or targeted values 303a, 303b, 303c may be obtained by the external device 300 from the database 1001 via the communication link 1004.

The operations performed by the hardware processor of the external device may further comprise: transmitting, for each subpart of the plurality of subparts of the compression garment 100 or for the portion of the compression garment 10, the corresponding measured values 302h and associated timestamps to the database 1001 for storage in the database 1001.

The operations performed by the hardware processor of the external device 300 may further comprise: receiving, from the database 1001, based on historical values stored in the database 1001 wherein the historical values include values previously measured for the at least one operational parameter and associated historical timestamps, instructions for displaying recommendation information to a user operating the external device 300, the recommendation information including behavioral recommendations for the user to comply with a particular compression therapy and/or recommendations regarding proper usage of the compression garment 100.

The third party component 1003 may also be communicating with the database 1001 via communication link 1006, such as via a network connection (e.g., LAN, WAN, or Internet). Each of the communication links 1004, 1006, 1007 and 1008 may be a bidirectional communication link allowing for bidirectional communication between the linked entities. The communication link 1008 between the compression therapy arrangement, including the compression garment 10, and the external device 300 may also be one-directional such that the compression therapy arrangement may transmit signals, such as the therapy signal 108, to the external device 300, but not vice versa.

The database 1001 may be located in the memory of the external device 300 or may be remote to the external device 300. The database 1001 may be located in the memory of the third party component or may be remote to the third party component 1003. The database 1001 may have built-in functionality to perform data analytics 1002 for any one of the determinations or calculations described herein. The built-in functionality to perform data analytics 1002 may be employed by the external device 300 and/or the third party component 1003 to determine operational states of the compression garment and/or to determine guidance for the patient how to behave and/or properly operate the garment 100 to achieve a desired therapeutic result.

When the external device 300 is operated by the patient, the third party component 1003 may be operated by clinic personnel or a physician. That is, the patient may use the mobile communication device 300 throughout her/his daily routine to operate and/or monitor the compression therapy arrangement including the compression garment 100 and can transmit compression therapy-related data to the clinic personnel over the physician via communication link or network connection 1007.

For example, the operations performed by the hardware processor of the external device 300 may further comprise: storing the obtained measured values for the operation parameters on the external device and/or transmitting, via link or connection 1007, the obtained measured values to a pre-approved third party's server 1003.

The clinic personnel or the physician having access to the third party's server 1003 can then, based on the received therapy-related data, assess whether or not the compression therapy works properly or if the patient should receive any additional behavior information by the clinic personnel or the physician in context of medical advice. The operations performed by the hardware processor of the external device may further comprise: generating instructions for display of the behavior information, the behavior information including instructions for the patient how to behave to comply with a particular desired compression therapy.

The external device 300 in the environment 1000 of FIG. 15 provides via its application 301 any combination of the above described functionalities, such as device monitoring, compression garment registration and tracking, patient log and/or patient guidance/education.

Figure 23A:
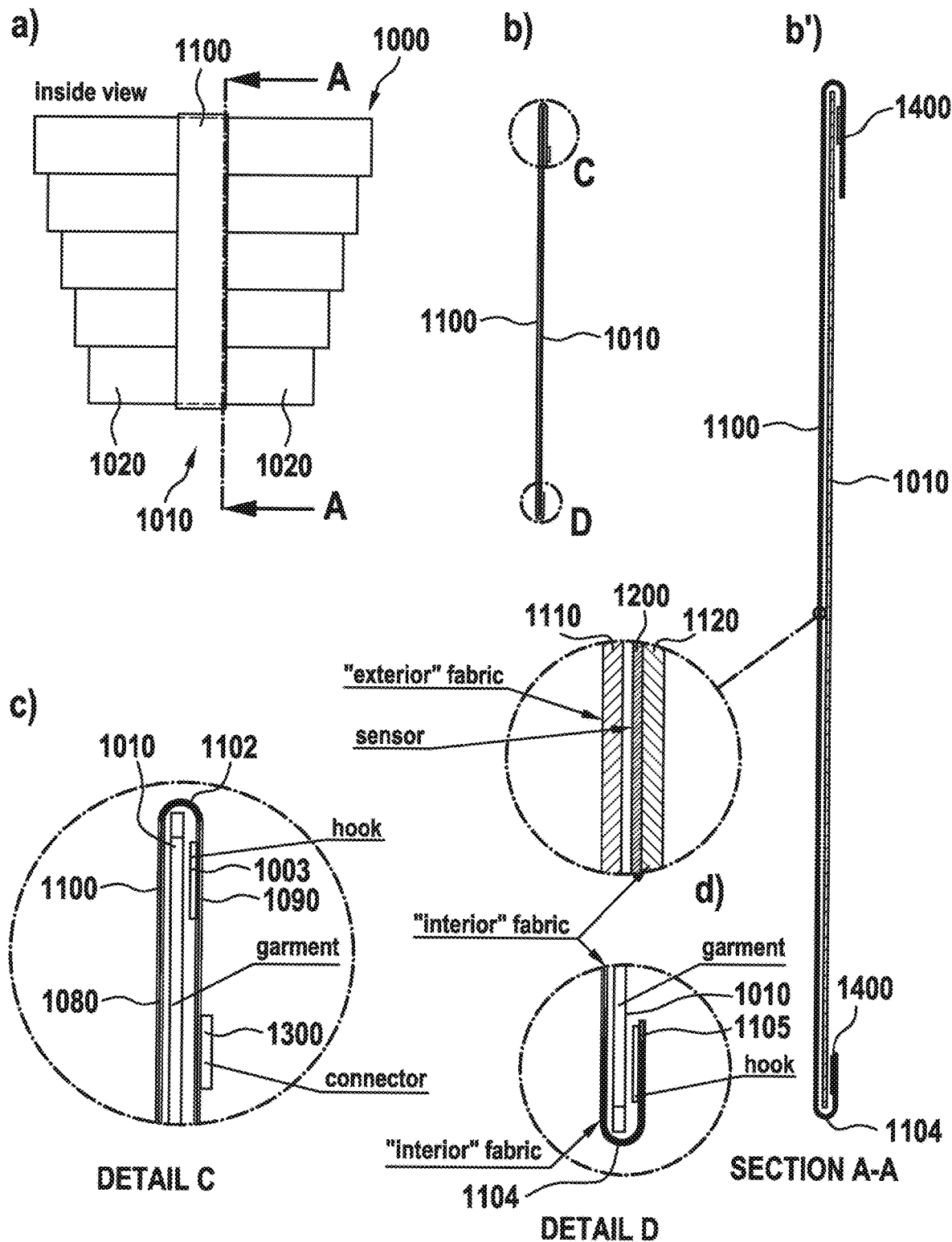
FIG. 23 shows a schematic illustration of a compression device according to an embodiment of the invention.
Figure 23B:
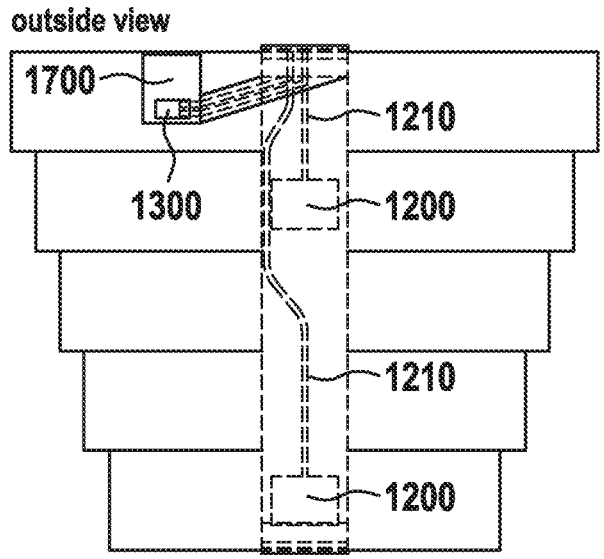
Figure 23B:
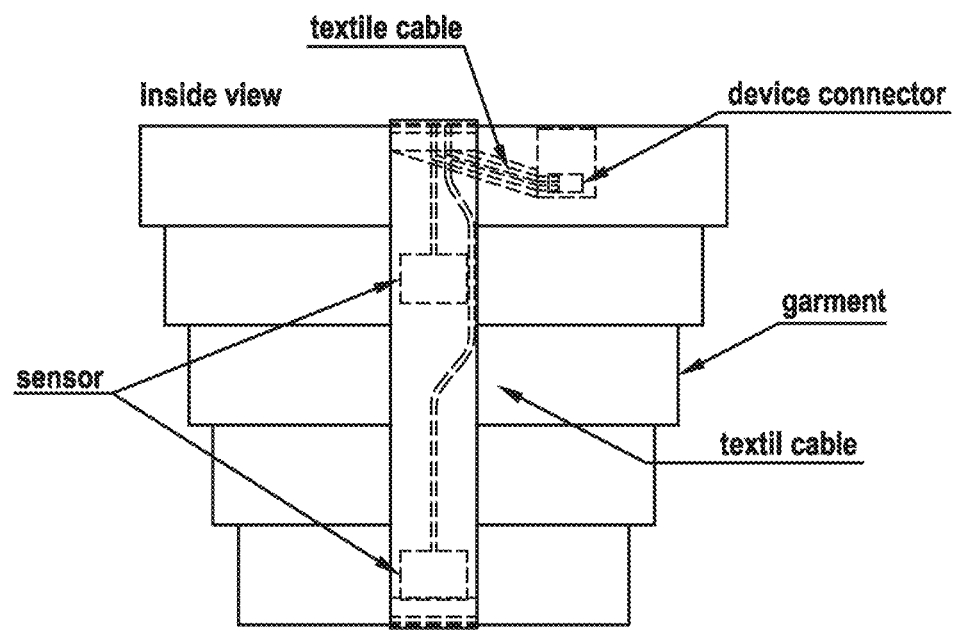

FIG. 23 schematically illustrates a compression device according to this invention. FIG. 23a) shows a plan view of a body facing side of the device. FIG. 23b) shows a cross-sectional view taken along cross-sectional plane A-A in FIG. 23a). FIG. 23b') shows an enlarged view of FIG. 23b). FIG. 23c) shows the detail C in FIG. 23b), FIG. 23d) shows the detail D in FIG. 23b) and FIG. 23e) shows a plan view on the outer side of the device shown in FIG. 23a).

The compression garment 1000 shown in FIG. 23 comprises a central spine 1010 covered by receptacle 1100 which accommodates sensors 1200 for determining external pressure exerted by the garment. Extending from opposite edges of the central spine 1010 bands 1020 are provided. Five bands on each side may be wrapped around a limb onto which external pressure should be exerted. In other embodiments four or less bands or more than five bands may be used. As illustrated in FIG. 23b) the receptacle 1100 is bend around opposing edges of central spine 1010. Bending portion 1102 at the upper edge of central spine 1010 connects front portion 1080 of receptacle 1100 with back portion 1090 of receptacle 1100. On the surface of back portion 1090 facing central spine 1010 a surface fastener element, e.g. a hook portion of the hook-and-loop fastener is attached which serves to releasably fix receptacle 1100 to central spine 1010 at a surface opposite to the body portion facing surface. On back portion 1090 of receptacle 1080 connector means 1300 are provided which serve to connect sensor elements 1200 accommodated within receptacle 1100 to supply and transmission means 1700 arranged on the rear surface of upper band 1020 of the compression garment 1000 (c.f. FIG. 23e). Similarly lower bend portion 1104 of receptacle 1100 connects front portion 1080 of receptacle 1100 with lower rear portion 1005 of receptacle 1100. Provided on the surface of lower back portion 1105 facing central spine 1010 is fastening element 1400 of the surface fastener, e.g. the hook portion of a hook-and-loop fastener. Thus, in a compression device shown in FIG. 23, receptacle 1100 is releasably fixed to central spine 1010 of the compression garment 1000 by surface fasteners provided on the rear side of the central spine. Accordingly, respective fastening means do not affect external pressure exerted by the compression garment 1000.

As shown in detail in FIG. 23b'), receptacle 1100 comprises fabric layers 1110 and 1120 accommodating there between a bendable pressure sensor 1200. Pressure sensors 1200 are provided on the body facing side of central spine 1010 of compression garment 1000.

In rear view of FIG. 23e), elements of the device covered by receptacle 1100 and/or the central spine 1010 are illustrated by dotted lines. As may be taken from the rear view of FIG. 23e) provided on body facing side of pressurizing means 1000 are two pressure sensors 1200. Each of the pressure sensors 1200 is connected to connector means 1300 via conductive wiring 1210 also accommodated within receptacle 1100. Conductive wiring 1210 is connected to supply and transmitter means 1700 via connector 1300.

In use spine 1010 is aligned to the limb portion onto which external pressure should be exerted and bands 1020 are wrapped around the limb to thereby effect the desired pressure generation. Pressure sensors 1200 are arranged on the body facing side of pressurizing means 1000. In determining external pressure with the aid of pressure sensors 1200, supply means 1700 are used to charge and discharge capacitors within pressure sensors 1200 and transmitter means 1700 are used to transmit respective data representing respective cycle numbers to an external device.

In the arrangement shown in FIG. 23d) pressure sensors 1200 are adhered to layer 1120 of receptacle 1100 which faces central spine 1010 of pressurizing means 1010. Fabric layer 1120 is sewn to fabric layer 1110 to thereby obtain a receptacle which is adapted to accommodate therein pressure sensors 1200.

In the embodiment shown in FIG. 23, receptacle 1100 extends essentially parallel to central spine 1010 and accommodates therein two pressure sensors 1200. In other embodiments of the invention pressure sensors 1200 may be attached to bands 1020 and may be accommodated within a receptacle which extends essentially parallel to bands 1020, i.e. essentially perpendicular to central spine 1010. In the embodiment shown in FIG. 16, supply and transmission means 1700 is releasably attached to connector means 1300. In other embodiments, wiring 1210 may be fixedly attached to supply and transmitter means 1700.

In other embodiments of the invention pressure sensors 1200 may be connected to supply and/or transmission means which are not affixed to the compression garment 1000 via conductive wiring. Each of the pressure sensors may be realized as illustrated in FIGS. 1 to 4. In other embodiments of the invention only one of the pressure sensors may be realized as a capacitive sensor while the other sensor may be realized by means of an inductor and/or a resistor.

Having described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, this description and these drawings are by way of example only.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. However, a processor may be implemented using circuitry in any suitable format.

Further, it should be appreciated that a computer, such as external device 300 or third party component 1003, may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable mobile or fixed communication device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the present invention may be embodied as a computer-readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a non-transitory computer-readable medium that can be considered to be a manufacture (i.e., article of manufacture) or a machine. Alternatively or additionally, the invention may be embodied as a computer readable medium other than a computer-readable storage medium, such as a propagating signal.

The terms "application", "app", "algorithm", "program code", "computer program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, the data record may be stored in computer-readable media in any suitable form. For simplicity of illustration, data records may be shown to have data record entries. However, any suitable mechanism may be used to establish locations within the data record to store data, such as parameter values.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user" or "patient". It should be appreciated that a "user" or "patient" need not be a single individual, and that in some embodiments, actions attributable to a "user" or "patient" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The present invention is defined by the following independent claims. Preferred embodiments are described by the following dependent claims as well as by aspects, examples and embodiments described above.

The invention claimed is:

1. A compression therapy arrangement comprising:
   a compression garment to exert external pressure on a body portion; and at least one sensor device associated with the compression garment and having at least one pressure sensor for determining the external pressure;

wherein the pressure sensor comprises:
at least one pressure circuitry having a sensing impedance that is dependent on the external pressure; and
at least one reference circuitry having a reference impedance that is independent from the external pressure;

wherein a cumulative signal that is dependent on the external pressure and one or more of an external temperature, an external moisture, and/or external electric fields acting in the vicinity of the sensing impedance is derivable from the pressure circuitry and a reference signal that is independent from the external pressure but dependent on other external influences acting in the vicinity of the reference circuitry;

wherein the pressure circuitry comprises:
a sensing capacitor having a capacitance that is dependent on the external pressure;

wherein the reference circuitry comprises:
a reference capacitor having a capacitance that is independent from the external pressure; and wherein the pressure sensor comprises:
a first at least partially conductive electrode layer;
a second, at least partially conductive electrode layer; and
a dielectric layer arranged between the first electrode layer and the second electrode layer;
wherein the electrode layers and the dielectric layer extend in parallel planes; and
wherein the dielectric layer comprises a compressible sensing portion that is obtained by composing the dielectric layer by a gas and a deformable material that is not compressible but conformable such that a change of capacitance of the pressure sensor is also effected by the replacement of air in the sensing portion by the conformable dielectric material.

2. The compression therapy arrangement of claim 1, wherein the pressure circuitry is arranged in close proximity to the reference circuitry.

3. The compression therapy arrangement of claim 1, wherein the pressure circuitry and the reference circuitry share common components.

4. The compression therapy arrangement of claim 1, wherein the first electrode layer or the second electrode layer has:
a conductive sensing area forming the sensing capacitor; and
a conductive reference area separated from the sensing area by an insulating area and forming the reference capacitor;
wherein a surface area of the sensing area facing the other electrode layer corresponds to a surface area of the reference area facing the other electrode layer.

5. The compression therapy arrangement of claim 4, wherein the sensing portion is arranged between the sensing area and an opposing area of the respective other electrode layer.

6. The compression therapy arrangement of claim 4, wherein the dielectric layer has an incompressible reference portion arranged between the reference area and an opposing area of the respective other electrode layer.

7. The compression therapy arrangement of claim 4, wherein the first electrode layer or the second electrode layer has a central rectangular sensing area and a circumferential reference area at least partially running around the sensing area.

8. The compression therapy arrangement of claim 4, wherein a thickness of the reference capacitor in a direction perpendicular to the reference area differs from a thickness of the sensing capacitor in a direction perpendicular to the sensing area.

9. The compression therapy arrangement of claim 1, wherein at least one of the sensing capacitor and, the reference capacitor, are at least partially embedded in a dielectric embedding arrangement.

10. The compression therapy arrangement of claim 9, wherein a portion of the embedding arrangement is water impermeable or gas permeable.

11. The compression therapy arrangement of claim 1, wherein the pressure sensor is deformable or conformable.

12. The compression therapy arrangement of claim 9, wherein at least one of the first electrode layer, the second electrode layer, the dielectric layer, the shielding layer, and the embedding arrangement is at least partially composed of a conformable material that includes silicone.

13. The compression therapy arrangement of claim 1, further comprising an external device, wherein the pressure sensor is connected to the external device by a low-ohmic wiring coupling or a wireless coupling.

14. The compression therapy arrangement of claim 13, wherein the low-ohmic wiring is electrically connected to at least one of the first electrode layer and the second electrode layer via silicone glue.

15. The compression therapy arrangement of claim 13, wherein the low-ohmic wiring is at least partially stretchable, conformable, or shielded.

16. The compression therapy arrangement of claim 13, wherein the external device is configured to:
charge the sensing capacitor or the reference capacitor; and
discharge the sensing capacitor or the reference capacitor to a collecting capacitor that has a capacitance that exceeds the capacitance of the sensing capacitor or the reference capacitor.

17. The compression therapy arrangement of claim 16, wherein the external device is configured to:
determine a first number of charge-discharge cycles needed to charge the collecting capacitor to a predetermined electric potential via the sensing capacitor as a cumulative signal;
determine a second number of charge-discharge cycles needed to charge the collecting capacitor to a predetermined potential via the reference capacitor after the reference capacitor and the collecting capacitor have been discharged as a reference signal; and
determine the external pressure by processing the first and second number of charge-discharge cycles.

* * * * *